(12) United States Patent
Mitola, III

(10) Patent No.: US 9,519,806 B2
(45) Date of Patent: Dec. 13, 2016

(54) DOMAIN-SPECIFIC HARDWIRED WEB SERVER MACHINE

(71) Applicant: Hackproof Technologies, Inc., Cocoa Beach, FL (US)

(72) Inventor: Joseph Mitola, III, Cocoa Beach, FL (US)

(73) Assignee: Hackproof Technologies, Inc., Cocoa Beach, FL (US)

( * ) Notice: Subject to any disclaimer, the term of this patent is extended or adjusted under 35 U.S.C. 154(b) by 250 days.

(21) Appl. No.: 14/321,097

(22) Filed: Jul. 1, 2014

(65) Prior Publication Data

US 2016/0006786 A1 Jan. 7, 2016

(51) Int. Cl.
| | |
|---|---|
| *G06F 15/173* | (2006.01) |
| *G06F 21/71* | (2013.01) |
| *G06F 21/56* | (2013.01) |
| *H04L 12/54* | (2013.01) |
| *G06F 21/57* | (2013.01) |
| *G06F 9/52* | (2006.01) |
| *G06F 21/76* | (2013.01) |
| *G06F 11/00* | (2006.01) |
| *H04L 29/08* | (2006.01) |

(52) U.S. Cl.
CPC ............ *G06F 21/71* (2013.01); *G06F 9/524* (2013.01); *G06F 11/00* (2013.01); *G06F 21/56* (2013.01); *G06F 21/57* (2013.01); *G06F 21/76* (2013.01); *H04L 12/5695* (2013.01); *H04L 67/02* (2013.01)

(58) Field of Classification Search
USPC .................. 709/226, 220, 240, 203; 712/241
See application file for complete search history.

(56) References Cited

U.S. PATENT DOCUMENTS

| 6,006,264 A * | 12/1999 | Colby ................. H04L 12/5695 709/220 |
| 2011/0302397 A1* | 12/2011 | Mitola, III .............. G06F 9/524 712/241 |
| 2012/0131316 A1* | 5/2012 | Mitola, III .............. G06F 21/57 712/241 |

OTHER PUBLICATIONS

Sep. 28, 2015 (WO) International Search Report—App. PCT/US2015/037182.
WebPHY Databus: "WebPHY Databus—A Web Server/Ethernet IP Core for FPGAs", Jun. 3, 2013, Retrieved from the Internet: URL: https:Ijwww.youtube.com/watch?v=QQRmjNZXH5g, 1 page, retrieved on Sep. 17, 2015.
Magdaleno, et al., "A FPGA Embedded Web Server for Remote Monitoring and Control of Smart Sensors Networks," Sensors, vol. 14, No. 1, Dec. 27, 2013, pp. 416-430.

(Continued)

*Primary Examiner* — Kyung H Shin
(74) *Attorney, Agent, or Firm* — Banner & Witcoff, Ltd.

(57) ABSTRACT

A domain-specific hardwired symbolic web server machine is described that processes information via the hardwired mapping of symbols from one or more domains onto other such domains, computing and communicating with improved security and reduced power consumption because it has no CPU, no Random Access Memory (RAM), no instruction registers, no Instruction Set Architecture (ISA), no operating system (OS) and no applications programming. The machine provides web services by recognizing legal requests such as HTTP GET request and responding with an HTML web page. In some embodiments, the machine has no unconstrained RAM into which malware may insert itself and needs no anti-virus software.

20 Claims, 20 Drawing Sheets

(56) References Cited

OTHER PUBLICATIONS

Arab, Gawen, "Web Server on a FPGA, without CPU, only VHDL (French)," Jan. 29, 2010, Retrieved from the Internet: URL:https://www.youtube.com/watch?, v=7syu5E, retrieved on Sep. 17, 2015, 1 page.

Anonymous: "Anatomy of an HTTP Transaction—Web Performance Monitoring and Optimization," catchpoint.com; May 14, 2013, Retrieved from the Internet: URL:https://web.archive.org/web/20130514104338//http://blog.catchpoint.com/2010/09/17//anatomyhttp; [retrieved on Sep. 18, 2015] p. 1-4.

Perkowski, Marek Andrzej, "Learning Hardware," Jun. 24, 2010, retrieved from http://web.cecs.pdx.edu/mperkows/CLASS_VHDL_99/tran888/lecture008-learning-hardware.pdf, retrieved Jun. 13, 2014, pp. 1-119.

Perkowski, et al, "Evolvable Hardware or Learning Hardware? Induction of State Machines from Temporal Logic Constraints," Evolvable Hardware, 1999. Proceeding of the First NASA/DOD Workshop O N. Pasadena, CA, Jul. 19-21, 1999, pp. 129-138.

Wikipedia, "Field-programmable gate array," Feb. 4, 2013, retrieved Jun. 13, 2013 from: http://en.wikipedia.org/w/index.php?title=Field=programmalbe_gate_array&oldid=536512233.

Notification of Transmittal the International Search Report and The Wirtten Opinion of the International Searching Authority dated Jul. 2, 2014, in International Application No. PCT/US2014/013337, 10 pages.

Jul. 30, 2015 (US) Non-Final Office Action—U.S. Appl. No. 13/799,277.

\* cited by examiner

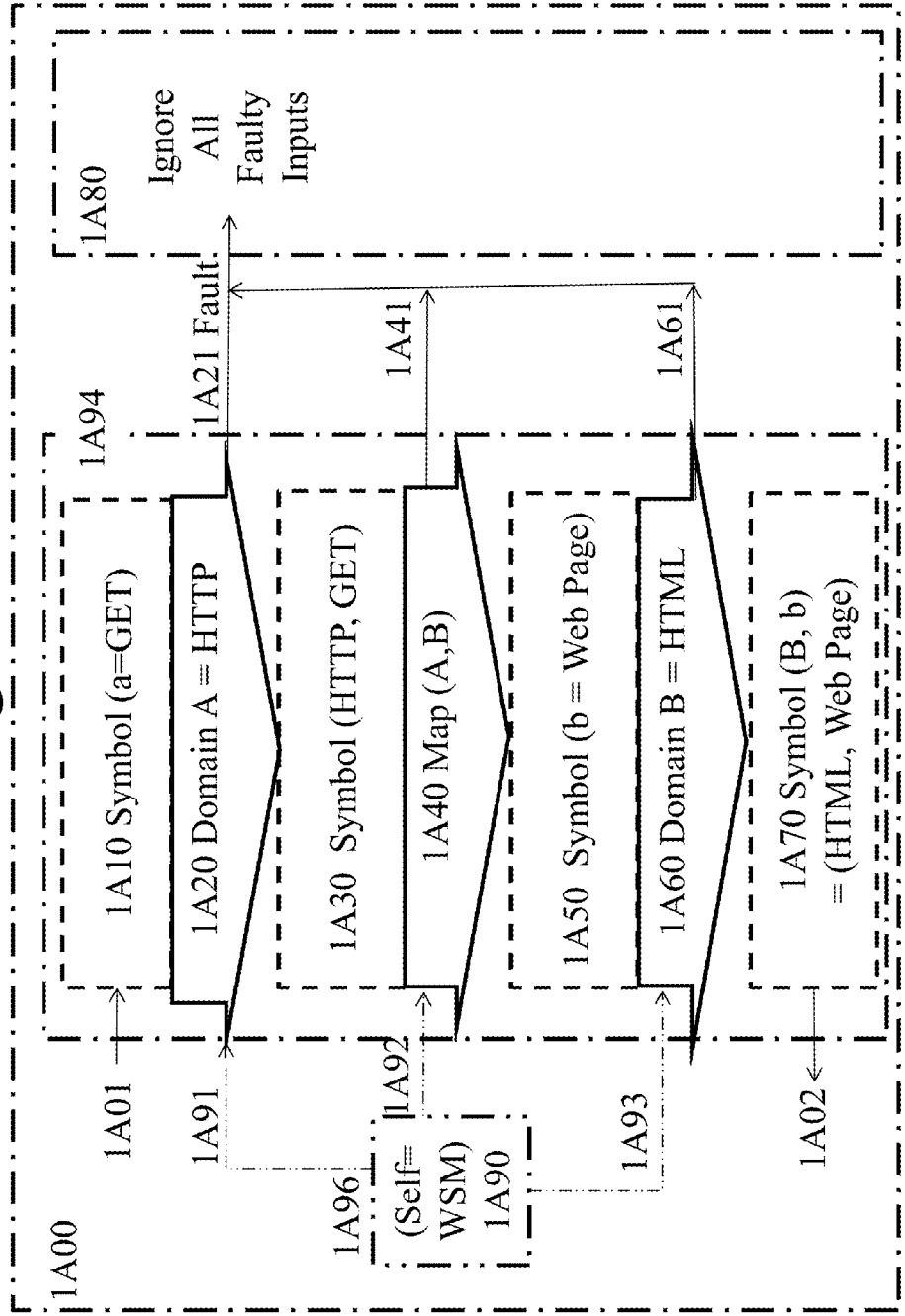

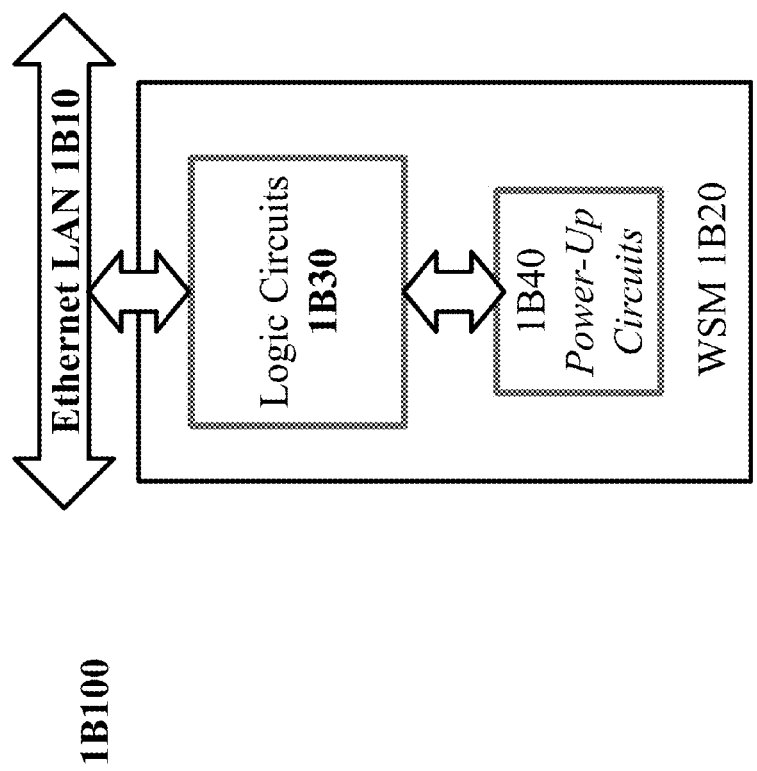

Specification of a Web Server Machine (WSM). in text as a system specification:

"A web server machine (WSM) shall accept TCP IP packets from an Ethernet port 80, shall recognize HTTP protocol synchronization (Syn) and GET requests, and shall respond with an HTML web page to the requesting IP address."

2B200

(Self (things (TCP IP (packet)(message))(HTTP (Syn request)(GET request))
(HTML (Web Page)))
[places [Ethernet[In[Port_80]]]
{TOP    {[Ethernet[In([TCP[Port_80 [In (packet)]]], [TCP[In][Out], [HTTP], [HTML]
        {[Ethernet[In([TCP[Port_80 [In (packet)]]] → [HTTP[Syn]}
        {[Ethernet[In([TCP[Port_80 [In (packet)]]] → [HTTP[GET]}
        {[HTTP(SYN x)]] → [HTTP[SYN (x+1)]]}
        {[HTTP(GET)]] → [HTML[Web Page]]}
        {[HTML (Web Page)] → [Ethernet[Out([TCP[Port_80 [Out (packet)]]]}}

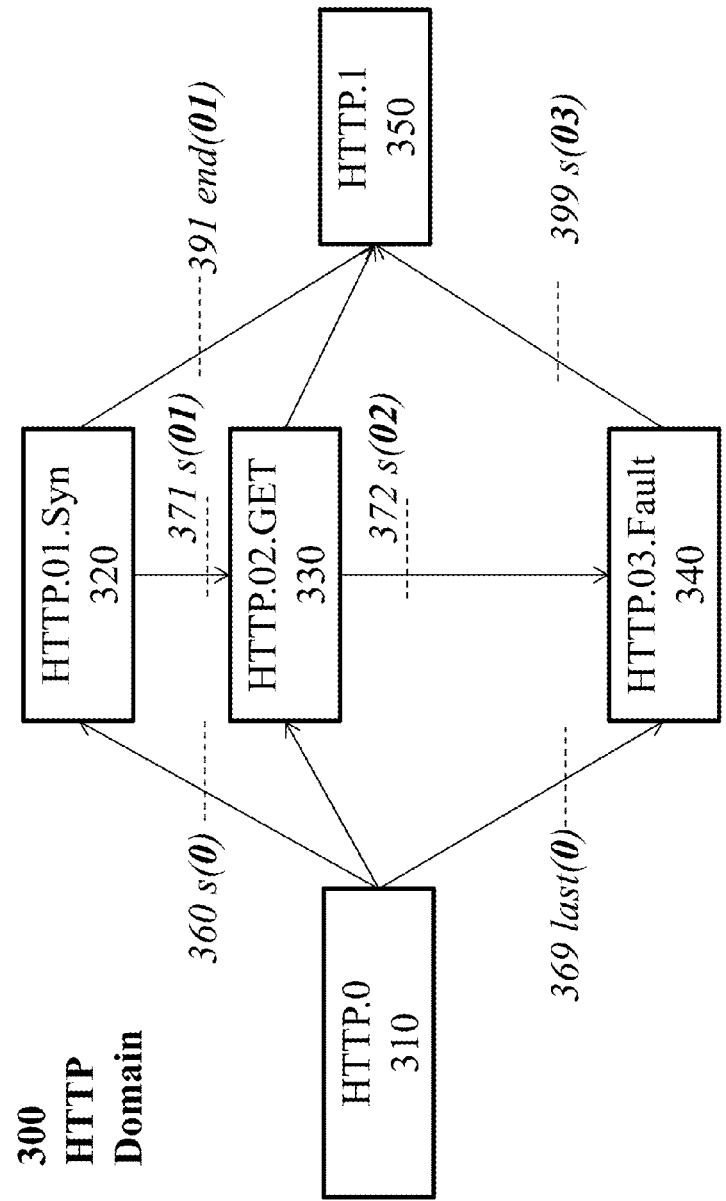

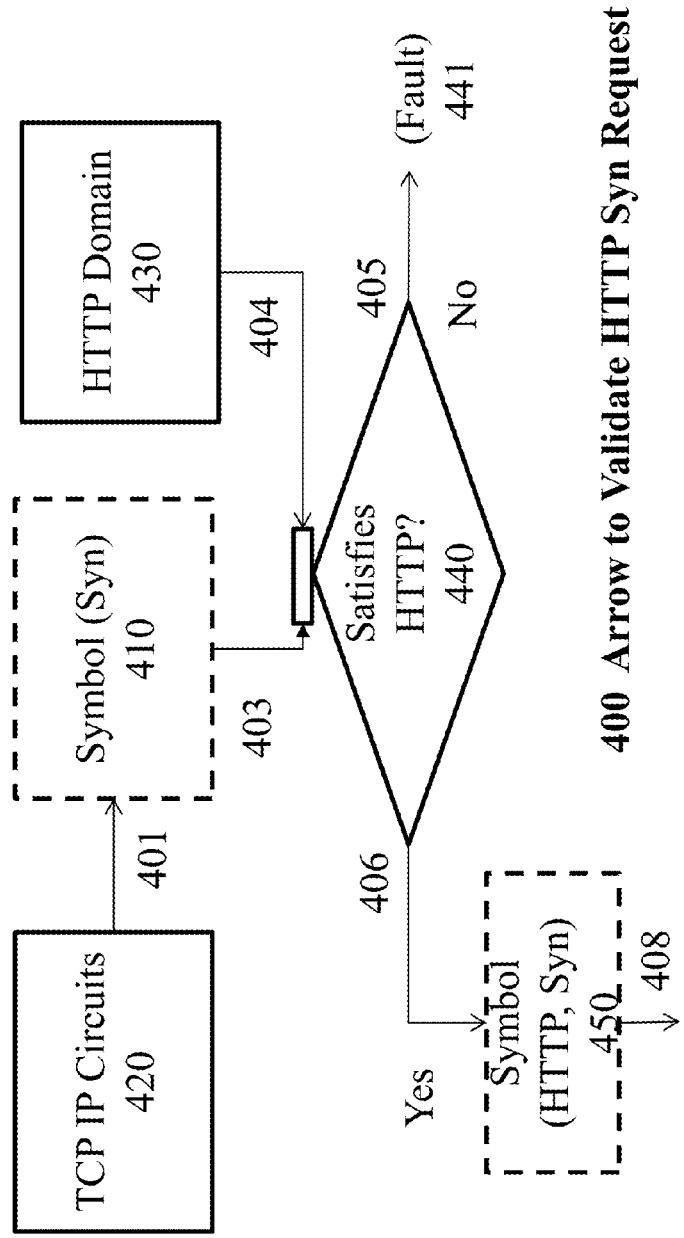

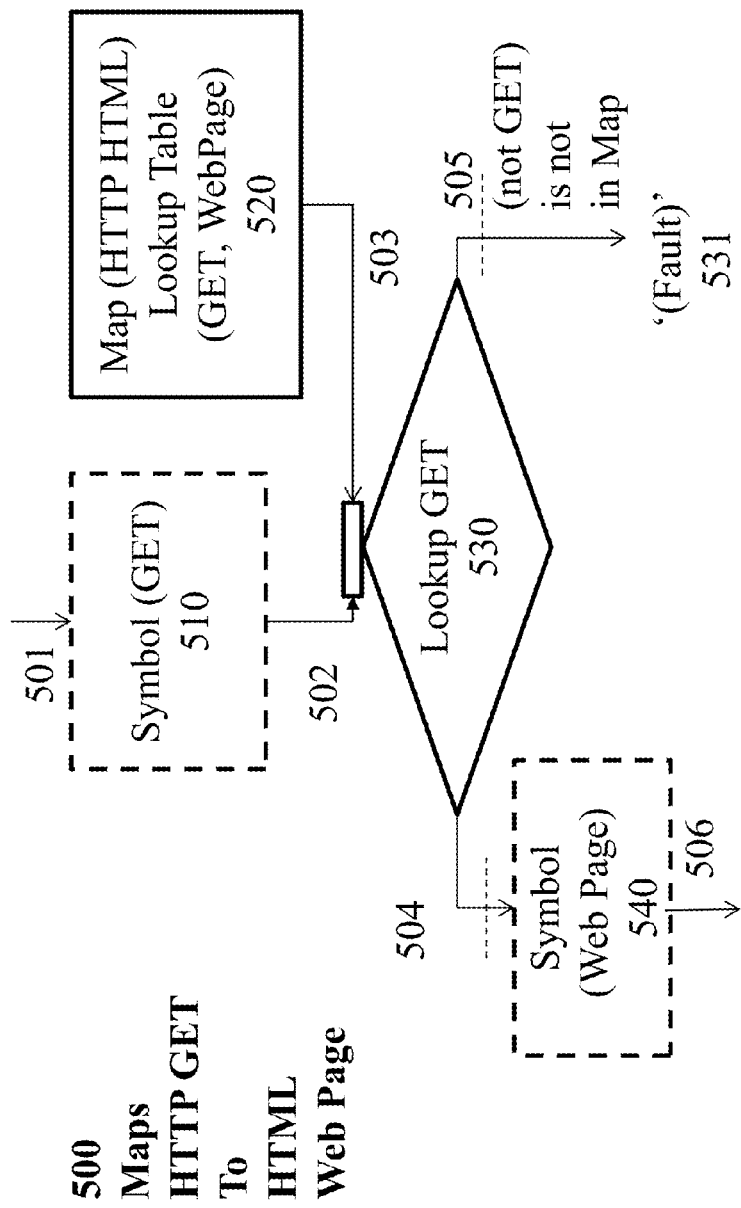

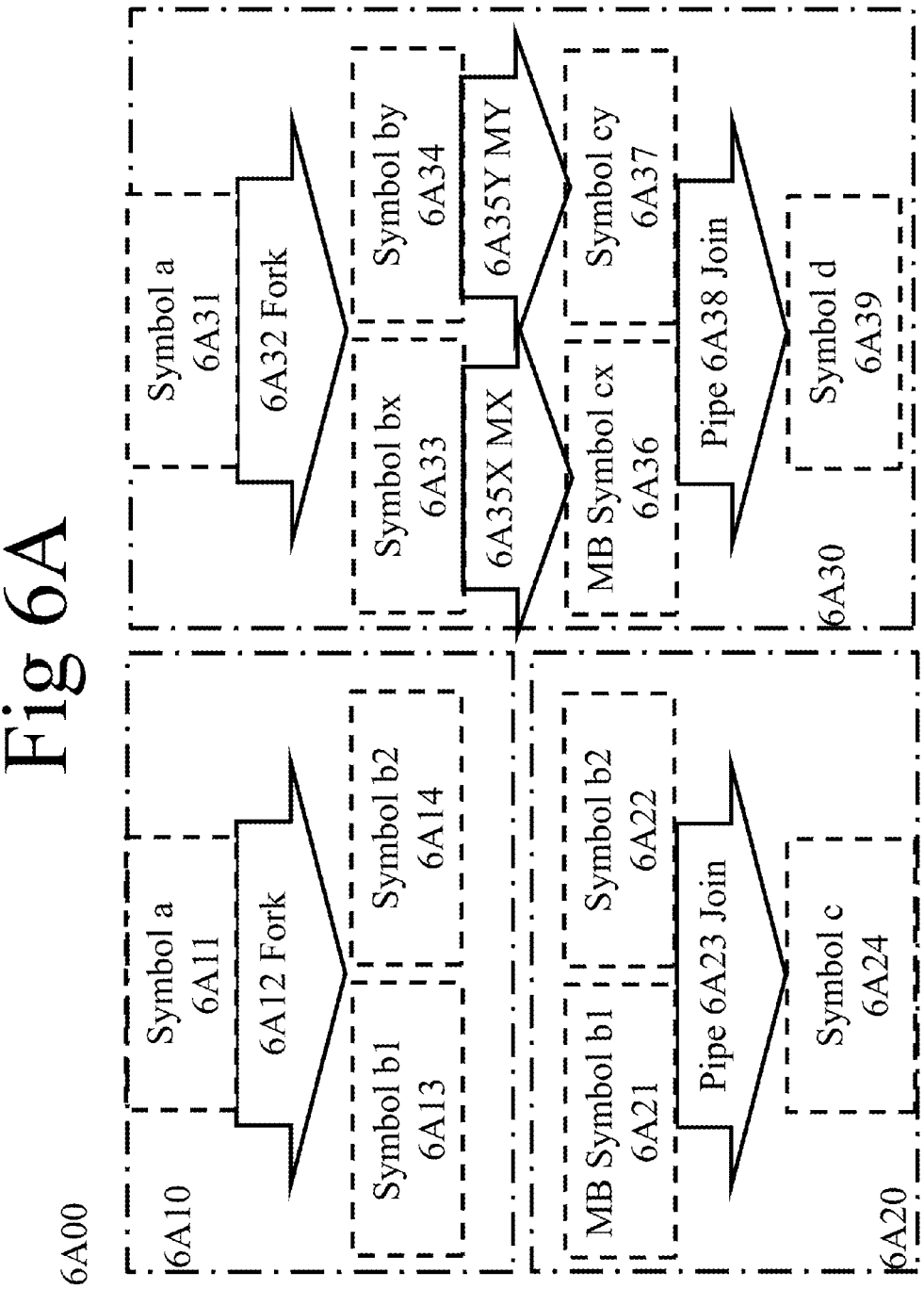

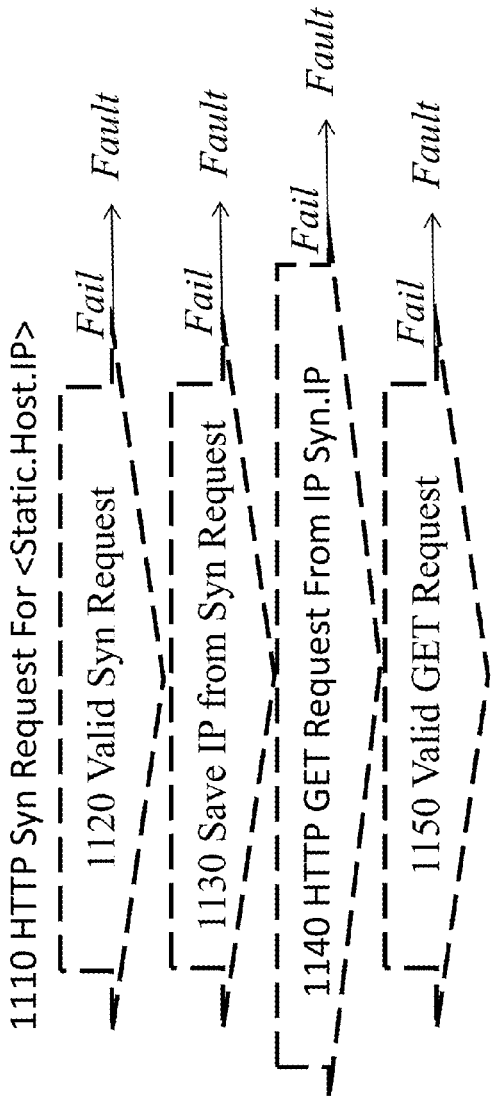

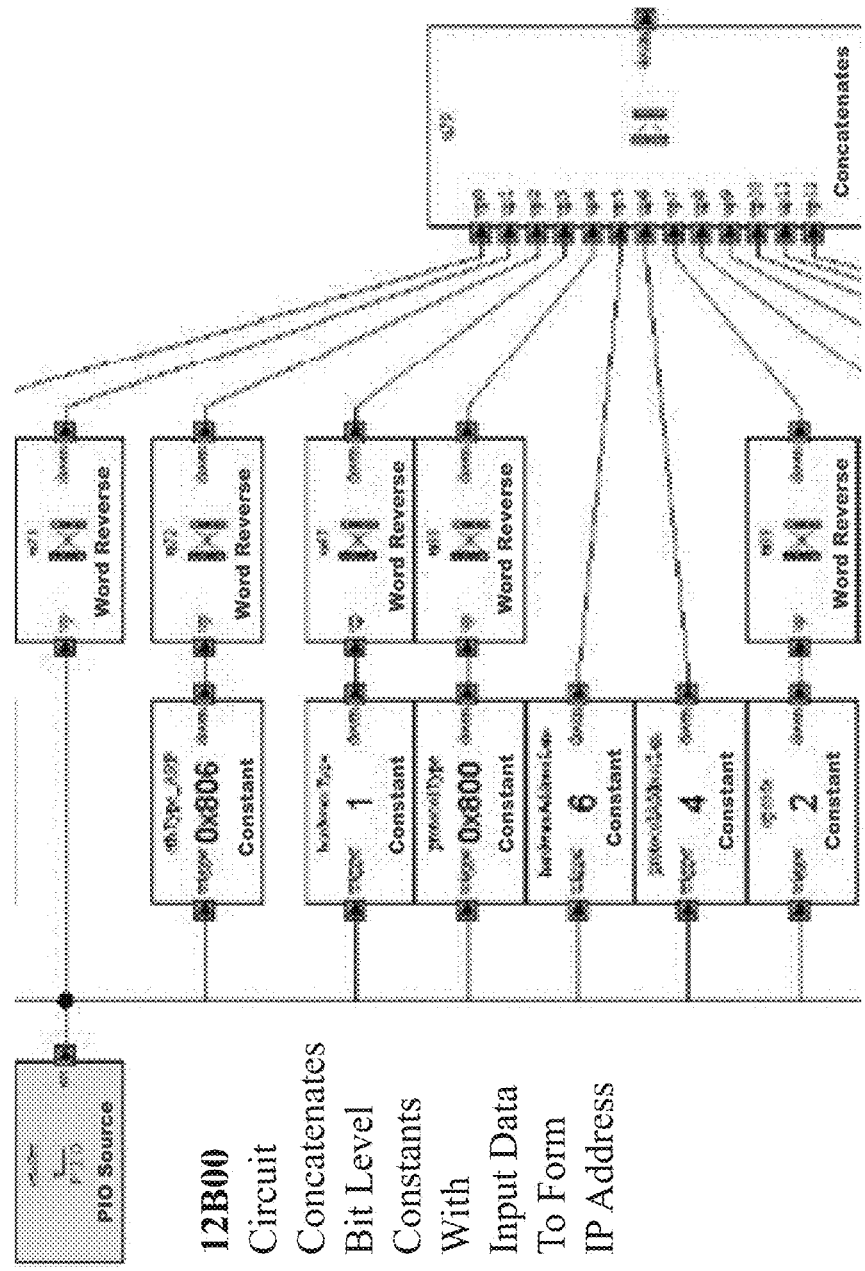

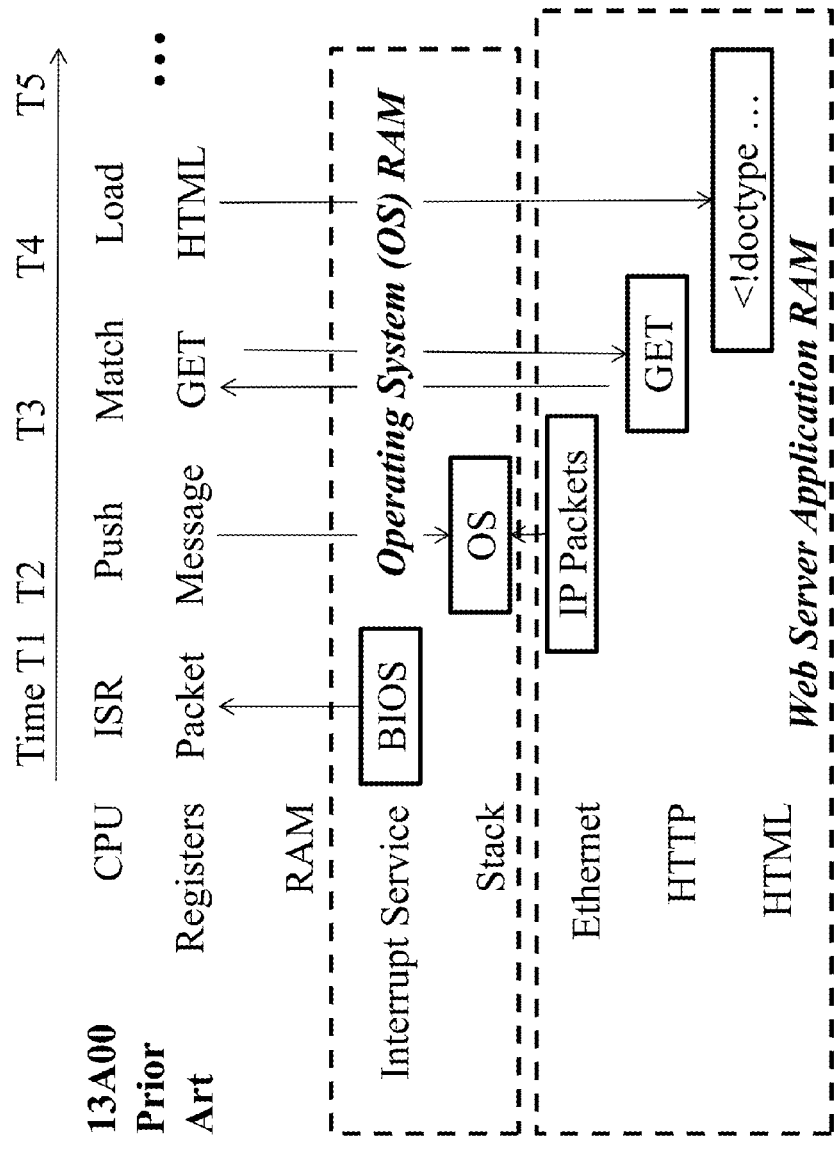

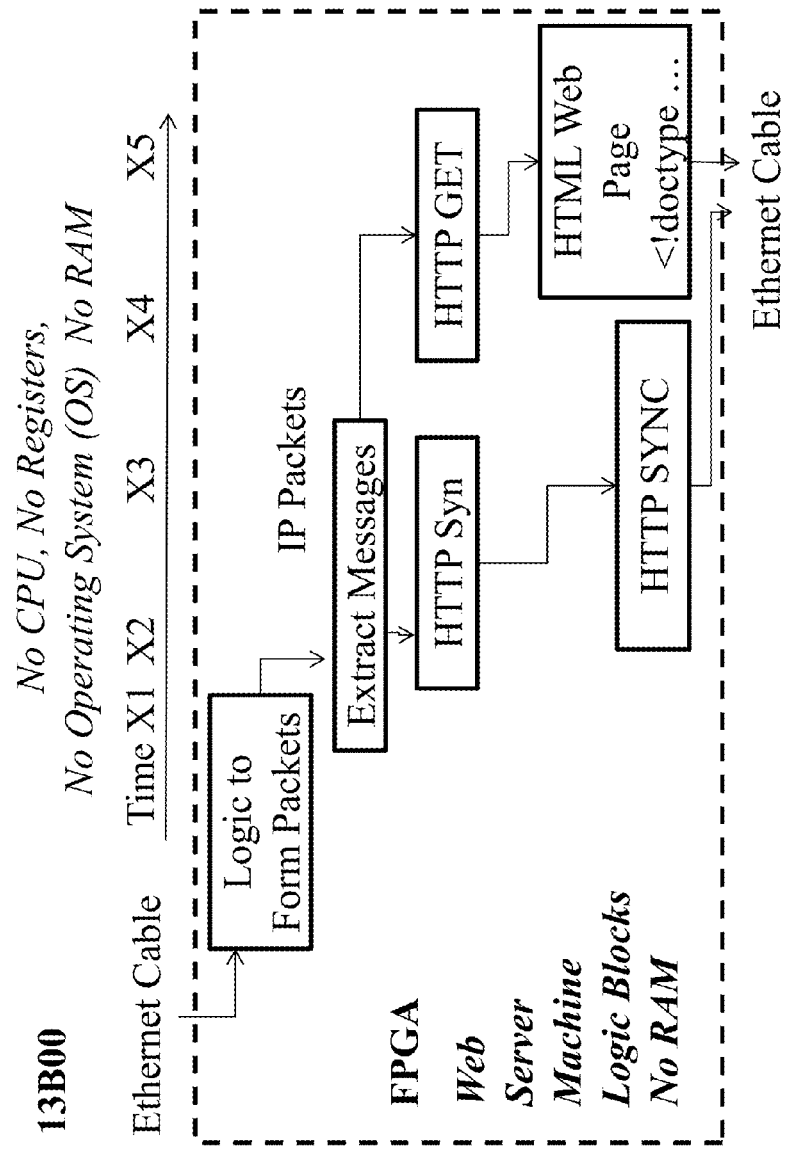

DOMAIN-SPECIFIC HARDWIRED WEB SERVER MACHINE

CROSS REFERENCE TO RELATED APPLICATIONS

The present application is related by subject matter to U.S. non-provisional application Ser. No. 13/799,277, filed Mar. 13, 2013, which is a non-provisional of U.S. provisional application Ser. No. 61/760,913, filed Feb. 5, 2013, entitled "A Domain-specific Hardwired Symbolic Learning Machine." Each of the above-mentioned applications is incorporated by reference in its entirety.

COPYRIGHT AUTHORIZATION

A portion of the disclosure contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This application is related to secure computing and communications.

BACKGROUND

Current Internet web page servers employ processor elements (PE) such as a central processor unit (CPU) with an associated memory hierarchy of cache, random access memory (RAM), hard drive(s) and/or network storage. PE's may be organized into a system on chip (SoC) or network on chip (NoC) of many PEs and memories, such as a graphics processing unit (GPU), which may incorporate one or more application-specific integrated circuit (ASIC) co-processors, such as a floating point unit, or may incorporate a reconfigurable co-processor (e.g. a field programmable gate array (FPGA)). Computer programming languages such as assembly languages, C and C++ are known in the art for creating software packages offering basic capabilities (e.g., an operating system (OS) of a computing device such as Windows or Linux). Other software packages can be created using other languages including higher level computer languages such as Java and JavaScript for programming higher level services (e.g., web services using OS services). A virtual machine such as the Java Virtual Machine (JVM) may facilitate the use of a language like Java on a variety of computers having a variety of instruction set architectures (ISAs). Web services may be provided to fixed and mobile devices like smart phones via a downloaded application or other service from a web server or other device accessible via a wired or wireless network. An arrangement of computing hardware, OS, virtual machines, and software may be computationally inefficient (e.g., because of the overhead of pushing and popping interrupt stacks in random access memory for software, virtual machines, and OS functions).

Machines having an arrangement of CPU registers, instruction set architecture (ISA), and memory, may be commonly referred to as Turing-equivalent (TE), and may be able to compute anything that is possible to envision. The register sequences of CPUs, PEs, and GPUs can be manipulated by malware to include subsequences that violate the authorized behavior of programming executed by computers and other devices connected via one or more networks. For example, a compromised network may be used to commit various cybercrimes, such as the theft of wealth via one or more data transfers. Conventional cybersecurity measures (e.g., hardware roots of trust, sandboxes, virtual machines, anti-virus, firewalls, and monitors) have been incapable of providing a permanent solution to such cybercrime.

Many types of cybercrime exploit Turing-Equivalence, for example, by exploiting the vast degrees of freedom, uncontrolled states of registers and memory, and sequences of instructions (which may never terminate) that compose Turing-equivalent machines. In other words, Turing-equivalence of shared CPU hardware, open ended nature of register sequences, layering of software, and re-programmability of local and networked memory systems may provide opportunities for malware to perform computing tasks that are not authorized and may result in, among other things, financial or physical damage.

BRIEF SUMMARY

This Summary is provided to introduce a selection of concepts in a simplified form that are further described below in the Detailed Description. This Summary is not intended to identify key or essential features of the invention.

A hardwired web server machine is described herein that is configured in such a way as to preclude the entry of malware into itself, which reduces the effects of networked malware and provides a more permanent solution to cybersecurity. The hardwired web server machine described herein (also referred herein as a web server machine, or a domain-specific hardwired web server machine) may include, for example, a computing machine in which open-ended register sequences and uncontrolled memory states of conventional computing and communications do not occur. In other words, the hardwired web server machine described herein is, for example, a machine with no CPU, no RAM, no instruction registers and no ISA.

In some embodiments, such a machine may organize data into symbols and may limit the symbols to members of enumerated sets called domains. Domains may be application-specific. For example, a web server machine may include an input domain such as a set of all valid HTTP GET requests for one or more web services. A web server machine may include a web page domain such as a set of valid HTTP 1.1 text representing web content.

A web server machine may allow for the use of fixed symbols and variable symbols. Fixed symbols may be encapsulated into hardwired memory constants such as read only memory (ROM). Variable symbols may be encapsulated into memory blocks that may be isolated from each other and may not be randomly accessed. Referring again to the hardwired constants that may form a fixed symbol, a web server machine may incorporate hardwired constants into a self-specification, briefly noted herein as "(Self)" or a "(Self) description." (Self) may describe the intended information processing behavior of the device. (Self) may be written in a human language.

A web server machine may encapsulate an information processing operation into isolated hardwired combinatorial logic termed a pipe circuit. A pipe circuit may be interconnected between pairs of domain-specific encapsulated objects such as for example flip-flop, register, or memory block. Instead of a shared-CPU performing instructions stored in memory, such a machine may realize the information processing functions of an application-specific sequence of conventional CPU instructions in a pipeline that may be a sequence of pipe circuits. Each pipe circuit may map (via its circuitry) a domain-specific value of a symbol contained in an input variable object into an intermediate value and may produce ultimately an intended domain-specific symbol as a variable output object. The map of a pipe circuit may be hardwired to be consistent with a (Self) description. There may be two or more pipe circuits, each of which may perform an identical map between two different pairs of encapsulated variable objects.

Such a machine may accept external stimuli (e.g. in the form of text and multimedia content represented in variable objects from one or more distinguished input ports) forming a variable composite symbol termed a token. A web services machine may accept an HTTP GET request, forming a GET token. Such a GET token may be realized in a variety of ways such as the text "GET" or more simply as a signal of a circuit configured to be interpreted as a GET signal. Such a machine may realize information processing by moving such tokens, whether as data or as signals, systematically through special-purpose unidirectional hardwired parallel symbol processing pipelines (groups of which are also referred herein as arrows) to result in the delivery of tokens representing the results of information processing to one or more distinguished output ports. A web server machine may move a GET token through an arrow to result in the delivery of a Web Page token to an output port. A pipe circuit may include a domain-enforcing circuit that may validate the conformance of a token to a domain (which has been hardwired into the machine, such as via a hardwired specification of such a domain in a (Self) description). Tokens and symbols entailed in token flow from input to output may be constrained via hardwired tests, e.g. of domain and for conformance to behaviors specified in a (Self) description.

Input stimuli forming tokens may be offered by one or more sensors or data communications interfaces such as a local area network or wireless link. Output tokens may be converted to text, graphics, voice, video, or other media (e.g. for external usage). The input ports, domains, maps, (Self) description, and output ports of such a machine may be immutable during operation, while allowing for extensibility via hardwired fault management circuits operating according to a hardwired (Self) description. Variable objects may enable tokens to flow through the immutable maps to provide information processing services such as email, database, spreadsheets, Internet access (e.g. world wide web) and other valuable information processing services.

Thus, a web server machine, which comprises hardwired connections and domain-specific functionality, may be one implementation of (or include aspects of) a Domain-specific User-defined Parallel Pipelined Learning (DUPPL) machine. As discussed throughout this disclosure, the domain-specific hardwired web server machine may be referred to as a Web Server Machine (WSM). In some embodiments, operating as a purposefully configured web server may be the machine's single function. To form the WSM, information processing functions for providing the WSM may be hardwired into ASICs, optical computing circuits, FPGAs, and/or other circuits or computing devices. A WSM may be simple, operating within a limited domain embodied as a domain-specific device such as an ASIC. A WSM may be flexible, operating within a specified set of domains and maps embodied in a flexible device such as a field programmable gate array (FPGA). Multiple simple and flexible WSMs may be interconnected by sharing domains. A collection of simpler devices, proximate or networked, may form a larger, more complex composite WSM capable of complex web services. Nevertheless, the function of a given chip, network, or system and of a composite machine or network of such WSMs may occur within the immutable boundaries of a given domain or set of domains that may be embodied into such a WSM via a (Self) description and that the machine itself may not change but may employ to limit its own behavior.

Compared to a conventional Turing-equivalent computer, cybersecurity may be improved by a WSM through, for example, a WSM's hardwired immutability of information processing, inherent self-checking of domains, self-referential consistency of a (Self) description, hardwired constants, encapsulated variable objects, and hardwired parallel pipelines. A WSM may need no virus protection because there is no unconstrained random access memory in which a virus may hide. These properties of a WSM may introduce a new category of information processing machine that may neutralize a vast range of malware such as computer viruses, keystroke loggers, worms, and advanced persistent threats.

BRIEF DESCRIPTION OF THE DRAWINGS

FIG. 1A illustrates an example block diagram of an apparatus configured to operate as a WSM according to one or more aspects described herein.

FIG. 1B illustrates a block diagram of a hardware configuration for a WSM according to various aspects described herein.

FIG. 2B illustrates example notations for a (Self) description of a WSM, which includes both a notation having a text form and a notation having a symbolic form.

FIG. 3 illustrates an example of a domain for a WSM that provides examples of fixed objects for the hypertext transfer protocol (HTTP), Syn and GET, and relationships thereof.

FIG. 4 illustrates an example block diagram for a validation arrow for a WSM that validates a domain.

FIG. 5 illustrates an example block diagram for a map arrow for a WSM that maps an HTTP request to an HTML response.

FIG. 6A illustrates examples of parallel pipes that may be formed by objects of memory blocks and arrows of pipes.

FIG. 11 illustrates additional details of token processing that occurs within a WSM.

FIG. 12B illustrates example circuitry for a WSM having constants for a domain of Internet Protocol (IP) addresses for the WSM.

FIG. 13B illustrates a time line for the operation of a web server application on a general purpose computer having random access memory and an operating system.

FIG. 13B illustrates an example time line of operation of WSM having no random access memory or operating system.

DETAILED DESCRIPTION

Introduction to Terminology

Figure 2A:
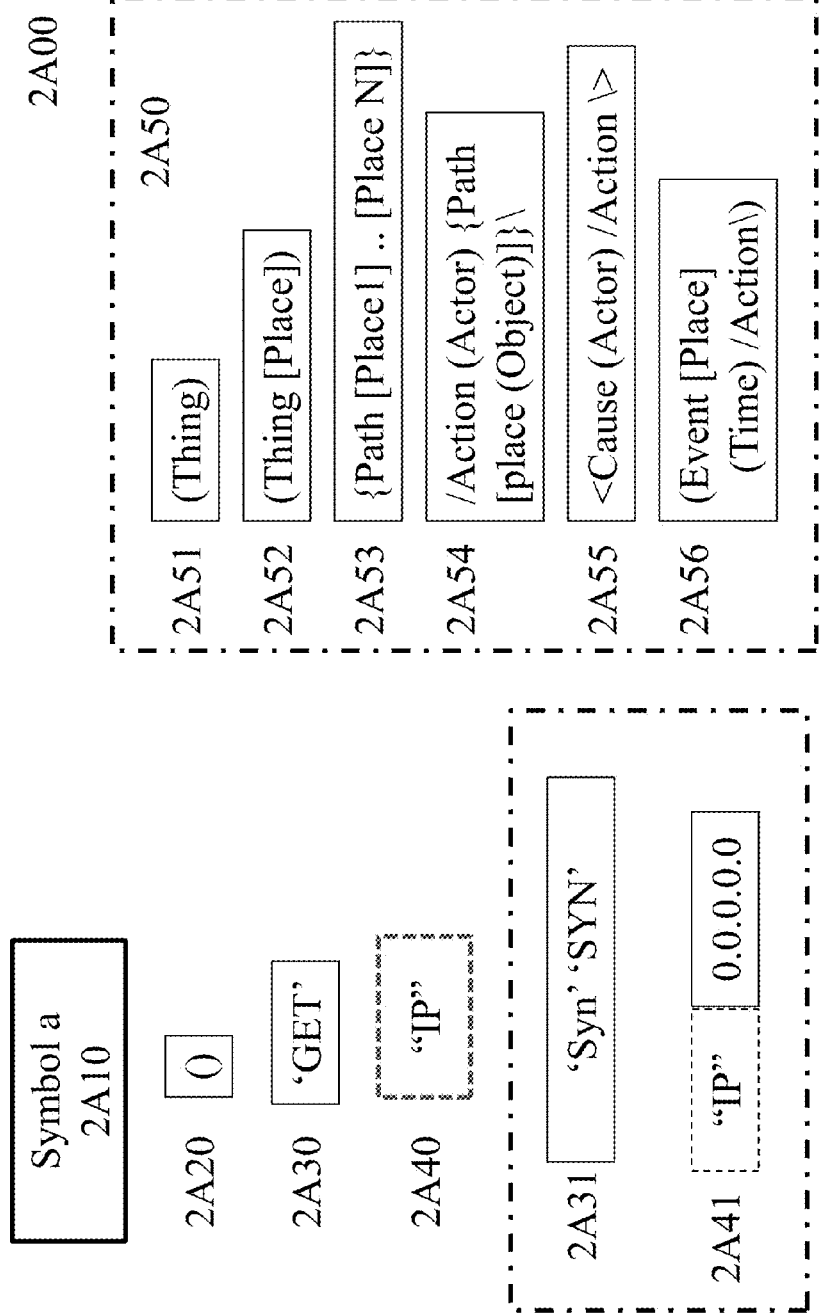
FIG. 2A illustrates example notations of symbols that may be used in a WSM according to various aspects described herein.

As discussed above in the brief summary, information processing functions of a WSM may be hardwired into the pipes of ASICs, optical computing circuits, FPGAs, and other circuits or computing devices that may comprise such a machine. Information of a WSM is stored and processed through the circuitry of a WSM in various forms. Such information forms may include: symbols, objects, tokens, domains, and a self-description, which is referred herein as "(Self)".

A symbol is textual data, the basic unit of information representation that conforms to a defined logical structure and is expected to be a member of a domain. For example, a symbol could be text such as "GET" and a symbol could be "IP Address 1.2.3.4.5". A WSM may express a symbol as a value of an object. Values of objects may be fixed and constant, that of a single symbol hardwired into such a WSM; or objects may be variable, capable of representing alternative symbols of a domain. For example, an object named "LegalRequest" may have a fixed value "GET;" a variable object named "IPAddress" may have a variable value "1.2.3.4.5". A WSM will know how to process a symbol according to its meaning. A symbol can be used in various ways throughout a WSM. In some instances, a symbol may be able to "flow" through the circuitry of a WSM. When a symbol "flows" through the circuitry of a WSM, it is referred to as a token. A token named Request may have a value GET, forming a token (Request GET) that may flow through a comparison with a LegalRequest, flowing further to generate a (WebPage) token, the text value of which may be provided to an output port.

An object is the basic unit of information storage and retrieval. An object may contain exactly one symbol. An object may be variable, containing alternative different symbols, or an object may be fixed, containing exactly one symbol for the life of the WSM of which it is a part.

A domain is a listing of symbols. Each symbol that is listed is a member of that domain. For example, if a domain provides a listing of "HTTP 1.0" and "HTTP 1.1", the symbol "HTTP 1.0" and the symbol "HTTP 1.1" are both members of the domain, e.g. the domain of HTTP protocols. A WSM will know how to process a domain, for example, to test a symbol to determine whether the symbol is a member of the domain. For example, if the symbol to be tested is "HTTP 6.0" it would not be a member of the above domain. However, if the symbol was "HTTP 1.0" it would be a member of the domain. A domain may be abstract such as a protocol or may be concrete such as the contents of a specific web page. A domain may refer to things that are external to a WSM such as a place via GPS coordinates or to things that may be internal to a WSM, such as (Self) hardware domain that may include a listing of the circuit boards of the (Self).

A (Self) may include a description of what the WSM can and cannot perform. The (Self) may include all domains and, thus, indicates all symbols that may validly occur within a WSM. A WSM will know how to process the (Self) to, for example, identify a particular domain in order for a symbol to be validated against the domain. In some arrangements, (Self) is hardwired into the WSM and cannot be changed throughout the life of the circuit.

As is apparent from the above description and the additional details described below, a WSM is comprised of various circuits including memory blocks and pipes.

A memory block may be comprised of various circuitry components necessary for storing the symbols. For example, with respect to ASIC and FPGA designs, a memory block may be comprised of various flip-flops, registers, wires and the like. In general, a memory block stores a symbol. In some instances, the memory block may act as a constant (e.g., the stored symbol cannot be changed physically nor electronically for the life of the circuit); a variable object (e.g., have contents that can change throughout the life of the circuit, such as by storing different symbols at different points in time); and an address (e.g., store a symbol that refers to the location of another memory block). Thus, a memory block may be a circuit representing an information object whether fixed or variable that may have as its contents at a given time a symbol of a given domain.

Additionally, memory blocks may be associated with other memory blocks. For example, a constant (e.g., memory block acting as a constant) may be associated with a variable object (e.g., memory block acting as a variable object) such that the constant provides a label or name for the variable object. The constant may act as an address that defines where the variable object in located in the memory space of the WSM e.g., so that a third memory block containing a token may access the variable object with the constant as its address. For example, a memory block having the fixed value 'LegalRequest' may be adjacent to a memory block having the fixed value 'GET', associating a symbolic name 'LegalRequest' with a value 'GET'. In a related example, a memory block having the fixed value 'Request' may be adjacent to a memory block having the variable value "Put", associating a symbolic name 'Request' with a value "Put" in this example, not a legal request. The memory block associations of a WSM may be defined in the (Self) via a one or more symbols and/or domains.

The definitions of the symbols and/or domains in the memory blocks form a part of the reasons a WSM is able to defeat attacks/hacks that a conventional computing device is susceptible to. As mentioned above, conventional computing devices are susceptible to attacks that inject malware into a web site. One example is an SQL injection attack. Malicious statements may be inserted into a data entry field of a web site so that the statements induce erroneous execution. For example, in an SQL injection attack, the single quote character, ', may be entered as a name. Such a value should be illegal as a name because it can cause a data base statement checking for "name" to check for "'" which may match every name in the database and return all database values to the attacker. The return of all database values to the attacker may be one of the purposes of the attack (e.g. to extract names and credit card numbers). In contrast, when a WSM is presented with a Request value of "'" such a value would not match a domain of legal values (e.g., the "GET" domain); therefore, the WSM would not respond to the single quote by returning all values of the database and, thus, is able to defeat this type of attack.

A pipe is circuitry that is located between at least two memory blocks. The circuitry of a pipe may be comprised of logic necessary to perform one or more designated functions, such as AND-gates, OR-gates, NAND-gates, inverters, and the like. The designated functions are generally related to the application being implemented by the WSM. Pipes may take the contents of one memory block as input, process the input according to, for example, a map between two symbols or an arrow between two domains, to produce output that is stored in a memory block. For example, a pipe may include circuitry that validates that a symbol is a member of domain. In a specific WSM, for example, a "GET" value of a 'LegalRequest' memory block defining a 'LegalRequests' domain may be compared with a "Put" value of a 'Request' token, resulting in a failure of such a token to conform to the 'LegalRequests' domain. A pipe may include circuitry that maps a symbol from one domain to a different domain. In a specific WSM, for example, a "GET" value of a 'Request' token conforming to a 'LegalRequests' domain may be mapped to a (Web Page) object having a value "(<html> . . . </html>)" of a 'WebPages' domain, resulting in a success of the token GET to conform to the LegalRequests domain to obtain a (Web Page) object from a WebPages domain.

The terms described above will be used throughout the disclosure when describing various embodiments of a WSM. Additional details of the circuitry used in a WSM will also be provided in connection with the various embodiments of a WSM. Additional details of the various forms information may take when stored or processed in a WSM will also be discussed in connection with the various embodiments.

Each circuit of a WSM may be associated an information processing purpose and function. The purpose and function of a memory block circuit may be to represent an information object that may have a fixed symbolic name and that may contain a symbol as its value. The purpose of a pipe may be to map a symbol of an input memory block into a resulting symbol of an output memory block. Further, additional circuits or information forms, or variations on the above discussed circuits and information forms, may also be introduced in connection with the various embodiments of a WSM described herein.

FIG. 1A, WSM Domain-Specific Hardwired Symbolic Web Server Machine

For ease of understanding the hardware of a WSM, various examples herein will utilize a web page application. Usage of this example application does not constrain the applicability of this disclosure to any other applications or from enumerating any other domain that may be required for a WSM implementing another application. For example, the basic hardware model of WSM may be used to convey a page of a spreadsheet or status of an electric power grid, or a database of credit cards. In such a spreadsheet example, Domain A={Row, Column}, which would be rows and columns of a spreadsheet to be displayed in a web page.

FIG. 1A illustrates an example domain-specific hardwired symbolic web server machine (WSM) apparatus, also referred herein as a WSM or WSM apparatus. FIG. 1A, in particular, illustrates a method of organization of the logic circuits of such a WSM, allocating example logic functions of a WSM 1A00 to example pipes 1A94, 1A96, and 1A80 of logic circuits. Logical features of such an apparatus may, for example, include a (Self) symbol 1A90 that may employ symbol notation to express the logic of the WSM; an application logical element 1A94 that may realize a web server application; and a fault management logical element 1A80 that may specify logic relating to logical errors that may be termed faults. An input network 1A01 may provide input data to an application logical element 1A94; an input data analysis logic circuit 1A10 may obtain from an input network 1A01 an input symbol, i.e., symbol a, as illustrated at 1A10, having an example value a equal to the text "GET" (briefly, "a=GET" in the drawing); a map circuit 1A20 may test a symbol, a, for conformance to a Domain A, of a map circuit 1A20, e.g. a Hypertext Protocol domain, HTTP; such a map circuit 1A20 may produce a result (HTTP, GET) associating a symbol GET with a Domain HTTP; a map circuit 1A40 may connect an input Domain A=HTTP to an output Domain B=Hypertext Markup Language, briefly HTML, accepting a symbol "GET" to generate a resulting symbol b=Web Page that may comprise text characters expressing such a Web Page; a symbol b=(Web Page) may represent a name or logical address to refer to text characters to conform to a Domain B, HTML; a map circuit 1A60 may test b for conformance to Domain B, HTML; logic of a circuit 1A70 may convert a symbol b referring to a (Web Page) to a form suited for transfer to an output circuit 1A02 such as retrieving the HTML contents and converting such HTML text to an Internet Protocol (IP) packet.

Thus, logic circuitry 1A94 may accept an HTTP GET symbol at an input 1A10 to produce an HTML Web Page at an output 1A70, implementing a web server application; circuitry 1A94 may provide an output text HTML Web Page to an output circuit 1A02. A web server application thus may be realized in circuits 1A94 of a WSM; a fault management logic element 1A80 may determine the way in which a WSM 1A00 responds to logic errors termed faults that may be detected, for example, in maps 1A20, 1A40, or 1A60, conveyed to circuits 1A80 via fault indicator circuits 1A21, 1A41, 1A61, such as by ignoring all faults; as may realize the logic of an example WSM apparatus. In some embodiments, a (Self) symbol 1A90 may indicate the logic of maps 1A20, 1A40 and 1A60; and of circuits 1A10, 1A30, 1A50, and 1A70 containing symbols; in some embodiments a (Self) symbol 1A90 may comprise and inform documentation that may be represented externally to a WSM apparatus; in some embodiments a (Self) symbol 1A90 may be realized in a logic circuit of such a WSM apparatus.

In order for pipe segment 1A40 to satisfy the conditions of being an arrow of category theory, the symbol 1A50, which results from Map (1A30, 1A50), must be a member of Domain 1A50. Therefore pipe segment 1A40 may validate symbol 1A50 as a member of Domain 1A50 of Web Pages. As with pipe segment 1A20, Map (1A30, 1A50) that is performed by pipe segment 1A40 may be subject to faults, such as the failure of a circuit. Therefore, a pipe segment 1A50 may detect faults, such as failure of the contents of variable memory block 1A50 to conform to a Web Pages Domain. In response, a pipe 1A40 may clear a memory block 1A50, not sending a response from a WSM, such as from logic circuits 1A40, 1A50, 1A60, and 1A70 to a network via circuits 1A02.

If symbol 1A50 is validated by pipe segment 1A40, the result may be provided to a network via circuits 1A50, 1A60, 1A70 and 1A02. Similar to memory block 1A10, a memory block 1A50 may be isolated from all of the other memory blocks. Additionally, a memory block 1A50 may not be accessed randomly. Preventing random access to a memory block may limit a WSM to only the domains embodied in circuits 1A20, such as of a Domain HTTP and of circuits 1A60 of a Domain HTML of Web Pages. In other words, a WSM may be considered domain-specific.

A memory block 1A50 may be validated by circuits of a pipe 1A60 for membership in a Domain HTML and thus may connect to an output symbol 1A70 that may further comprise a circuit that may deliver content based on a symbol provided via an IP port 1A02 of a network. For convenience of reference, an input port 1A01 such as "Port 80" of an IP network 1A01 and an output port 1A02 such as "Port 80" of an IP network 1A02 may be associated into an input-output circuit such as an Ethernet LAN or a universal serial bus (USB) connection; or any other convenient input output circuit.

Accordingly, a WSM performs information processing through an arrangement that processes symbols that are stored in various memory blocks that may be isolated, the contents of which may be obtained through various pipe segments. To contrast the differences between a WSM and a conventional computer, in a conventional computer, such data would be generated in registers of a CPU and subsequently stored in a random access memory (RAM). However, within a WSM, there may be a rigorous flow of valid information via tokens from a specific input port to a specific output port through a sequence of isolated memory blocks. The pipe segments of a WSM (e.g., pipe segments 1A20 and 1A40 of FIG. 1A) may together form a unidirectional portion of circuitry (e.g., tokens only flow one way through the circuitry) that may be referred to as a pipeline. In various arrangements, pipelines may include various numbers of pipe segments, but may not form loops. Looping behavior may be achieved by the regular transformation of inputs to outputs via a flow of tokens through the parallel pipelines of core circuits 1A00 and via networks 1A01 and 1A02. Such flow of tokens may update the state of memory of various blocks of such a machine. A circuit representing (Time) may provide an input to a WSM at a regular time interval. A (Self) 1A90 may specify such a time interval. WSMs may be paired so that one WSM provides inputs to another WSM, input ports attached to output ports establishing a flow of tokens in a looping arrangement between such machines that may be constrained to domains and maps of each machine with respect to the other.

FIG. 1B, Example WSM Environment

FIG. 1B illustrates an example environment 1B100 where a WSM apparatus may be used to receive and respond to requests for a web page. Network environment 1B10 may include a local area network (LAN) such as an Ethernet LAN connecting a networked device (not shown in the figure) such as a computer or smart phone to a WSM 1B20. A networked device may contain an application such as a web browser that may request a web page via such network connections. A WSM 1B20 may comprise one or more logic circuits 1B30 that may realize logic such as that needed to provide web services including circuitry needed to provide the WSM 100 of FIG. 1. Additionally, a WSM environment for a WSM 1B20 may incorporate power-up circuits 1B40 that may be configured to initialize a WSM 1B20, e.g. as needed for a field programmable gate array (FPGA) upon power-up according to an example pattern of FPGA circuits disclosed hereinafter. In such an environment 1B100, input may enter WSM 1B20 via a network input 1B10 via, for example, an Internet Protocol (IP) port associated with an Ethernet LAN (e.g. port 80, which is commonly used for requesting and receiving web pages). Input may include text (e.g. from a wireline network or wireless device or network). Text may include requests for web service, such as a hypertext transfer protocol (HTTP) request to get a page, e.g. a GET request, e.g. according to logic circuits 1A94 of FIG. 1.

A WSM 1B20 may comprise a hardwired machine such as logic circuits 1B30 that may be realized in a field programmable gate array (FPGA) chip, for example. A WSM FPGA chip 1B30 may be initialized at power up by circuits 1B40 specifically designed to load an FPGA personality into a WSM FPGA chip 1B30. Power-up circuits 140 may comprise a general purpose computer that is not connected to any device or network and that may contain data such as a bit map for an FPGA; such as the text of a web page; such as an IP address; and such as other data needed at the initialization of an FPGA logic circuits 1B30 realizing logic 1A00 of FIG. 1. Power-up circuits 1B40 are known to those skilled in the art as appropriate to load an FPGA chip at time of powering up such an FPGA chip. An example pattern of circuits to be loaded at such time are illustrated in circuits described in conjunction with FIGS. 6C, 7A, and 12A.

FIG. 2A, Symbol Notation for a WSM

FIG. 2A illustrates symbol notation for a WSM. In particular, a fixed symbol 2A30 may express a fixed item such as the three text characters 'GET' which may be the exact text expressing an HTTP GET request in a TCP IP packet from a remote web browser. A notation having single quotes around its object, such as 'GET', may express a constant symbol 2A30. A variable symbol 2A40 may represent a value that may be defined at some point in the future and that may be subject to change, such as an Internet Protocol (IP) address of a computer sending a GET request via a network 1B10 of FIG. 1B. A symbol notation having double quotes may place double quotes around its object, such as "IP" indicating an unknown IP address. An association 2A31 of a fixed and variable symbol may indicate that a memory block 2A31 may have a name in single quotes that may contain a fixed value in single quotes, such as a memory block named 'Syn' containing a fixed value 'SYN', i.e. three text characters. An association 2A41 of a fixed and variable symbol may indicate that a memory block 2A41 may have a name, "IP", in double quotes that may contain a variable value, such as a memory block named "IP" containing a variable value of an IP address, e.g. "0.0.0.0" that may consist of five numbers separated by periods also termed 'dots' according to IP usage.

Put briefly, a category may refer generally to a collection of objects and arrows having particular algebraic structure (e.g., an identity map exists for each object of each arrow of such a category). Each pipe circuit of a WSM may represent an arrow of category theory (an example of which is termed a morphism in other branches of mathematics). The pipe segments along with the memory blocks (e.g., those blocks acting as variable objects) together may realize the mathematical structure of categories with finite limits. By realizing the mathematical structure of such finite limit categories, a WSM may provide increased information security.

Further, due to the formulation and construction of a WSM, in at least some embodiments, a WSM may realize its symbols 2A00 and functions 1A00 in an FPGA chip 1A20 that contains no shared registers, no random access memory (RAM), no shared central processing unit (CPU) or other processing elements (PEs) of a Turing computer, and no stored program memories of any sort (e.g., no operating system, no applications programming). Despite not containing these components of a conventional computing device, a WSM may perform information processing via symbols, hardwired circuitry that map the symbols according to the domains of the (Self) descriptions, e.g. using symbol notation 2A00, e.g. embodied in an FPGA chip 1A20, and memory blocks storing the symbols that operate as the input, intermediate values, stored values, and output for the hard-wired connections. Accordingly, a WSM, for example, may supply the contents of a web page without fear of a malicious software agent entering the WSM web server to change the function in such a way as to assist malware via the unauthorized use of the hardware, e.g. as was the widely reported intent of the StuxNet malware.

A WSM may be embodied in an ASIC and/or FPGA, and the examples throughout this disclosure are described in connection with an FPGA. However, embodiments of a WSM could be implemented using different computing devices, including optical computing, optical storage devices, optical switching; analog or digital charge coupled devices, and the like.

FIG. 2B, Example Symbol Notation of a WSM Self-Description

FIG. 2B illustrates a symbol notation for a (Self) description of a WSM having a form 2B100 of a document and having a form 2B200 of a symbol. The scroll indicating a document 2B100, for example, illustrates a specification of a WSM in text as it may be convenient for usage as a system specification. According to the method of symbols of this invention, there may be a mathematical relationship of domains, maps, and arrows of such a WSM specification and of a (Self) symbol further describing such a WSM. For example, according to 2B100, a WSM may be specified as a machine that "shall accept TCP IP packets from an Ethernet port 80; shall recognized HTTP protocol synchronization (Syn) and GET requests; and shall respond with an HTML web page to the requesting IP address." Accordingly, a symbol 2B200 may express such a specification in symbol notation. For example employing symbol notation of FIG. 2A, a thing may be noted as (thing) 2A51. A (Self) thing may itself contain more specific things 2A51, such as via notation 2A51: (Self (things (packet) (message) (Syn request) (GET request) (Web Page)). In this example the (Self . . . ) is a (thing) 2A51, the notation for which extends between the two outer parenthesis of such a (Self . . . ) symbol. A further symbol (things . . . ) within such a (Self . . . ) symbol may list symbol notations corresponding to (objects) of the self, such as a (packet) or a (GET) request.

A (Self . . . ) may incorporate further notation regarding places 2A52, FIG. 2A, that may refer to specific details of a logical circuit of a (Self). In 2B200, there may be [places . . . ] that may refer, for example, to an Ethernet port 80 circuit with a WSM 1A00 of FIG. 1 having an Ethernet port within its input logic 1A01, i.e. acting as an input that may be expressed as a symbol '(Self . . . [Ethernet[In [Port_80]]] . . . )'. In some embodiments, a (Self) notation may correspond to a circuit 1A90. In some embodiments, a (Self) notation may correspond to documentation. In circuit and documentation usage of symbol notation, a pair of outer parenthesis of the (Self . . . ) notation may indicate the entirety of the (Self). In this example, the Ethernet is expressed a [place] 2A52 of the (Self). A symbol "[In[" of a lager Ethernet port symbol 2B200 may express the input feature of the Ethernet with respect to the (Self). In this example, the symbol "In" is a fixed symbol that may be expressed as notation 'In' according to symbolic notation. Thus, a more explicit symbol for Ethernet port 80 may include many single quotation marks, such as ('Self' . . . ['Ethernet' ['Input' ['Port_80'] . . . ] . . . ). However, for the greater clarity of improved readability, a simplified symbol notation (Self) may refer to a more explicit symbol notation ('Self'). A simplified notation 2B200 may refer to constant symbols. A symbol notation 2B200 for a WSM may include other places that may correspond to logic of a WSM, such as a place for [TCP[In][Out]] that may correspond to logic of the TCP IP protocol. Another symbol for a place of a WSM may include a domain, such as a place [HTTP], e.g. that may list the elements of a Domain HTTP, such as 'SYN' and 'GET'. A symbol notation 2B200 may include a place [HTML] in which there place may be an HTML object, such as a (Web Page). So a symbol notation for a (Self) may incorporate a variety of symbols that may express a specification.

A flow of information through a WSM may be expressed in a (Self) symbol 2B200 as a {path . . . } 2A53 according to which a thing such as an (IP packet), or more simply (packet), may flow, e.g. from an input port to a HTTP domain causing a related flow, e.g. of a (Web Page) to an output port. According to notation 2A00, a {path} may be named; e.g. a top level path from input to output may be named {TOP . . . }. Such a top level path may include other paths that may correspond to maps 120, 140, and 160 of a WSM 100. Such maps noted by corresponding paths may in turn correspond to circuits of pipes that may realize the logic of maps, e.g. of maps 1A20, 1A40, and 1A60 of FIG. 1A. A top level path {TOP . . . } may express itself as a sequence of lower level paths. For example, a path {TOP} may express more specifically {TOP {[Ethernet[In([TCP [Port_80 [In (packet)]]→[HTTP[(request)]} {[HTTP (GET)]]→[HTML[Web Page]]} {[HTML (Web Page)]→ [Ethernet[Out([TCP[Port_80 [Out (packet)]]}}. In such a case, the scope of the top level path extends from the first bracket, {, to the last bracket, }. For convenience of understanding the logic of such a WSM, a lower level path may be given a name according to notation 2A53. For example, a path {[Ethernet[In([TCP[Port_80 [In (packet)]]→[HTTP [(request)]} may be referred to as a named path {Get_IP}, indicating that such a path may refer to circuits that may get a (request) object from packets of an Ethernet port. A circuit 1A91 from a (Self) circuit 1A90 to a map 1A20 may establish a logical relationship between the functions of a map 1A20 and the symbols of a {Get_IP} path of a (Self) 1A90.

Another path of (Self) 1A90 noted explicitly as {[HTTP (GET)]]→[HTML[Web Page]]} may be noted for convenience as a path {Respond_to_GET_request} indicating that the logic function of such a path may be to respond to an HTTP GET request. A circuit 1A92 from a (Self) circuit 1A90 to a map 1A20 may establish a logical relationship between the logic of a map 1A20 and the symbols of a {Respond_to_GET_request} path of a (Self) 1A90, such as that an HTTP GET request results in an HTML Web Page.

A further path of a top level path {TOP} may comprise {[HTML (Web Page)]→[Ethernet[Out([TCP[Port_80 [Out (packet)]]}. Such a path may be referred to more conveniently as {publish_page}, indicating that such a path may convert a (Web Page) object of an HTML domain that may be located in an HTML place in a WSM into a series of (packet) objects in an Ethernet output port circuit of such a device. A circuit 1A93 from a (Self) circuit 1A90 to a map 1A60 may establish a logical relationship between the functions of a map 1A60 and the symbols of a {publish_page} path of a (Self) 1A90, such as that an HTML Web Page may be converted to TCP (packets) for Ethernet output.

Thus, a {TOP} path may comprise three paths {Get_IP}, {Respond_to_GET_request}, and {publish_page}. An equivalent (Self) notation may express a path {TOP} as a sequence of these three named paths, i.e. {TOP {Get_IP} {Respond_to_GET_request} {publish_page} }. In various implementations, it may be convenient for a (Self) circuit 1A90 of FIG. 1A to connect via circuits 1A91, 1A92, and 1A93 to map 1A20, 1A40, and 1A60. In various implementations it may be convenient to express a (Self) symbol in documentation as a guide for circuit design.

There may be mathematical relationships between a specification 2B100 and a symbol 2B200. One such mathematical relationship between a word, HTTP, in a specification 2B100 and a symbol 'HTTP' in a symbol 2B200 may be termed a one to one mapping (briefly, 1:1). One such mathematical relationship between a specification 2B 100 and a symbol 2B200 may be that such a specification and such a symbol are complete with respect to each other such that a symbol may be complete with respect to a specification and a related specification may be complete with respect to a corresponding symbol; such a mathematical relationship of completeness may be termed mapping a specification ONTO a symbol and mapping a corresponding symbol ONTO a corresponding specification, briefly ONTO. There may be a mathematical relationship between such 1:1 and ONTO relationships that it does not matter whether one begins with a specification or begins with a symbol, both relationships 1:1 and ONTO apply; such a correspondence may be termed that 1:1 and ONTO each may have inverses.

There may be a further mathematical relationship between a symbol and an item of hardware such that for each circuit in hardware there is a corresponding symbol. There may be a further mathematical relationship between an item of hardware and a corresponding symbol such that for each constituent symbol of a given symbol there corresponds a circuit of such hardware; such a mathematical relationship between symbol and hardware then may be 1:1, ONTO, and have inverses. Constructing an item of hardware according to a symbol such that there may be 1:1, ONTO, and inverse mathematical relationships may embody mathematical properties of a symbol into such hardware. For example, a symbol may express a finite domain such as the set of all valid HTTP requests; corresponding hardware may embody such a symbol (e.g. as text 'HTTP') and as a list of all HTTP requests to which such hardware will respond, such as 'Syn' and 'GET'. Such explicit finiteness may impart advantages to hardware. For example, if malware expresses itself to the hardware as an HTTP request, a map of the hardware, not finding the malware expression in its finite domain HTTP, may respond to the malware as a fault or error (e.g., respond not as if a valid HTTP request was received).

FIG. 3 an Example WSM Domain: HTTP

As explained above, a symbol for a place of a WSM may include a domain, such as a symbol for a place [HTTP]. The symbol for the place [HTTP] may contain symbols for the things contained in such a Domain, such as 'SYN' and 'GET' (e.g., [HTTP (SYN) (GET)]). FIG. 3 illustrates example circuits of a WSM domain using HTTP as an illustrative Internet domain. Circuits of a domain [HTTP (SYN) (GET)] may be termed circuits for a hypertext transfer protocol (HTTP) domain 300; circuits of such a domain for example may include a circuit 310 that embodies a fixed symbol 'HTTP.0' that may indicate a circuit for an HTTP domain; circuits of such a domain for example may include a circuit 320 that embodies a fixed sequence number 01 and that further embodies a fixed object, HTTP.01.Syn embodying a fixed text value, 'Syn;' circuits of such an example domain may include a circuit 330 that embodies a fixed sequence number 02 and that further embodies a fixed object, HTTP.02.GET, embodying a fixed text value, 'GET;' circuits of such an example domain may include a circuit 340 that embodies a fixed sequence number 03 and that further embodies a fixed object, HTTP.03.Fault, embodying a fixed text value, 'Fault;' circuits of such an example domain may include a circuit 350 that embodies a fixed object, HTTP.1, an object that terminates a domain HTTP.

Circuits of an example HTTP domain 300 may include a successor circuit 360, s(0), more specifically s(HTTP.0) that may indicate a successor object, HTTP.01.Syn of a starting object HTTP.0; an example successor circuit 371, s(01), more specifically s(HTTP.01.Syn) may indicate a successor object, HTTP.02.GET of a starting object HTTP.01.Syn; an example successor circuit 372, s(02), more specifically s(HTTP.02.GET) may indicate a successor object, HTTP.03.Fault, of a starting object HTTP.02.GET—circuits of such a Fault object may connect domain circuits to fault management circuits or may handle faults (e.g. by ignoring an input that would attempt to use a successor of HTTP.GET); an example successor circuit 399, s(03), more specifically s(HTTP.03.Fault) may indicate a successor object 350, HTTP.1, a domain terminating object, of a starting object HTTP.03.Fault; an example type of successor circuit 391, end(01) may associate an object HTTP.01.Syn with a terminal object 350, HTTP.1, more specifically s(HTTP.01.Syn) that may indicate a domain ending successor object 350, HTTP.1, of a starting object HTTP.01.Syn. Other relationships in addition to those thus far illustrated may be included in order to perform logic related to such a domain.

FIG. 4, an Example Domain Validation Arrow

As explained above, a WSM may include a domain validation arrow 120 that may compare a symbol 1A10 to a domain A, for example an HTTP domain, that may comprise circuits illustrated in FIG. 3. FIG. 4 illustrates an example block diagram for the logic of circuits of an example domain validation arrow 1A20 of a domain of FIG. 3. A symbol comprising text 'Syn' may enter an arrow 1A20 via circuits 401 for temporary storage in a memory block 410 of FIG. 4.

Memory block 410 may be isolated from other memory blocks of a WSM. In such an example, a symbol may not flow from a memory block 410 directly to any other memory block (e.g., to a memory block 1A30 of FIG. 1A or to any other memory block). Instead, a symbol may flow from a memory block 410 via one or more pipe segments having the logic of FIG. 4, such as via a domain validation pipe segment 1A20 having logic illustrated in FIG. 4. A symbol may flow from a memory block 410 corresponding to a memory block 1A10 of FIG. 1A to a memory block 1A30 of FIG. 1A via a pipe segment 1A20 that may comprise the logic of FIG. 4. In some arrangements, there may be only one way for symbols to flow from memory block 410 to memory block 1A30 such as through pipe segment 1A20 comprising the logic of FIG. 4.

In a WSM, a pipe segment may perform a domain membership test, as shown by pipe segment 1A20 of FIG. 1A, realized in some embodiments via the logic of FIG. 4. To ensure that symbol 410 is in fact a member of a Domain HTTP, various checks may be performed. For example, symbol 410 may be compared to circuits of a Domain HTTP 430 to determine that the value of symbol 410, e.g. 'Syn', is found within a Domain HTTP of circuits 430. Pipe segment 1A20 may be realized as a fixed, unidirectional structure of combinatorial logic, e.g. according to FIG. 4.

By way of illustration in FIG. 4, circuits of a network 420 may obtain a symbol 'Syn' to deposit such a symbol in a memory block 410. Logic circuits 440 may compare the value of a symbol stored in memory block 410 presented via circuits 403 with members of an HTTP domain, e.g. of FIG. 3 that may comprise circuits 430 of FIG. 4. Finding a symbol 'Syn' in circuits 430, circuits 440 may form a symbol (HTTP, Syn) that may be stored in an example memory block 450. Such a memory block 450 may realize symbol 1A30 of FIG. 1. A symbol (HTTP, Syn) comprising notation for an object may be termed a token that may flow through a WSM from one memory block 450 realizing symbol 1A30 to another pipe such as pipe 1A40 of FIG. 1A.

Suppose circuits 440 do not find the contents of memory block 410 in circuits 430; then circuits 440 may generate a (Fault) symbol 441, and circuits 405 may generate a domain fault signal 441, an error in which an input symbol is not found in a domain.

A WSM may be configured to expect that symbol of memory block 410 is a member of a Domain HTTP. A domain such as that illustrated in circuits 440 may be very specific such as depending on the web services application being implemented by such a WSM. The determination performed by pipe segment 120 according to logic of FIG. 4 may produce a new symbol 450 indicative of the domain that was checked and the original input symbol, mapping a valid input 410 to a valid output 450.

In another example, a symbol 410 may be produced via TCP IP circuits 420 that may, for example, contain text "Put 162.239.31.72". The text "Put" could fail to satisfy the domain membership test performed by pipe segment 1A20 according to logic 400 (e.g. if "Put" is not found in the domain HTTP that may include 'Syn' and 'GET' but not 'Put'). Accordingly, a pipe segment 1A20, according to logic 400 may ignore input of a memory block 410 containing text "Put", e.g. by clearing variable memory block 410 via a hardware reset line that may reset block 410 after receipt of such an input.

A pipe 1A20 testing a symbol 1A10 according to the logic 400 comprises one example of a domain test. Other symbols obtained from a network according to circuits 420 may cause other symbols 450 configured by circuits 406 according to the symbol notation of FIGS. 2A and 2B according to the needs of other types of web services applications.

FIG. 5, Mapping HTTP GET to HTML Web Page

FIG. 5 illustrates an example block diagram for a map arrow, which maps an HTTP request to an HTML response. For example as illustrated in FIG. 5, a symbol may be obtained by circuits 501 and represented in memory block 510. In one embodiment, memory block 510 may realize the memory and associated logic of symbol 1A30 of FIG. 1A. In such embodiments, the logic of circuits of FIG. 5 may realize the function of map 1A40 of FIG. 1A. Map 1A40 may be realized by the logic of a pipe segment that may perform a mapping from one domain to a different domain, for example according to the logic of circuits illustrated in FIG. 5. According to the logic test 530 of FIG. 5, a pipe segment may map an input that may occur in one domain to determine an output that may occur in another domain. Map 520, for example, provides a lookup table by which elements of a one domain are associated with elements of another domain. In this example 520, a GET request is a valid member of an HTTP domain. As shown in the entry (GET, WebPage) of lookup table 520, a GET request is associated with to an item denoted by the text symbol 'WebPage' that occurs in the output domain of HTML responses listed in lookup table 520. A lookup table is just one example of the many alternative ways of representing an association between an input symbol 510 and a resulting symbol 540. Thus logic circuit 530 may look up any input symbol 510 in the lookup table 530 to determine an output for the pipe realized by logic circuits 500. In one case, circuits 500 may generate a symbol (WebPage) as an output symbol 540, the generation of which may be signaled to other circuits via output signaling line 506; in another case, circuits 500 may generate a (Fault) signal 531 that may stimulate other circuits to respond to such a failure for an input to be associated with an output in of a pipe 1A40 realized by circuits 500.

The contents of a memory block 540 returning a response may be set only by circuits 504 of pipe logic 500, which may complete the logic function of mapping a value of a symbol 510 of one domain of a variable memory block 510 to a resulting variable memory block 540. A Map (HTTP, HTML) of lookup table 520 is shown to map domain HTTP, for example including a GET request, onto a domain HTML, for example including various Web Pages. Such a map 1A40 may comprise a complete map termed an arrow if the logic 500 covers all of the possibilities between the two domains and thus achieves a degree of completeness of mathematical structure in mapping Domain HTTP onto Domain HTML via, e.g. lookup table 520. A mapping performed by a pipe segment 1A40 may satisfy the definition of a finite limit sketch category, as is known in the branches of higher mathematics of computability and of category theory. Thus a very simple computational device such as a lookup table with associated logic circuits 500 may realize in hardware a theory of computability that may reduce or eliminate malware from entering into a WSM or from using a WSM in a manner in which it was not intended.

Pipe segments may be simple circuitry, such as the a logic of a lookup table 500; or may be more complex circuitry, such as a circuit to compare a variable content of a memory block to circuits describing a domain of legal requests embodied in the logic circuits via text or other data representing symbols according to notation 2A00 for example.

Symbols being output at a port 1A02 of FIG. 1A (e.g., further illustrated as, for example, comprising circuits of a network 1B10 of FIG. 1B) may be further converted by circuitry in the WSM. For example, the WSM may convert any symbol received at a port 1A10 to human-readable text, images, audio, etc. Users of the WSM or other devices attached to the WSM (e.g., via a display or via a network connection) then may be provided with the web data.

FIG. 6A Fork, Join, and Parallel Pipelines

FIG. 6A illustrates examples of parallel pipes that may include pipes that fork, pipes that join, hierarchical pipes and pipes that may be formed by objects of memory blocks; pipes having completeness with respect to domains may comprise arrows of pipes in a DUPPL machine. A WSM may employ such parallel pipelines as further illustrated in FIGS. 6C, 7, and 12A

Figure 6B:
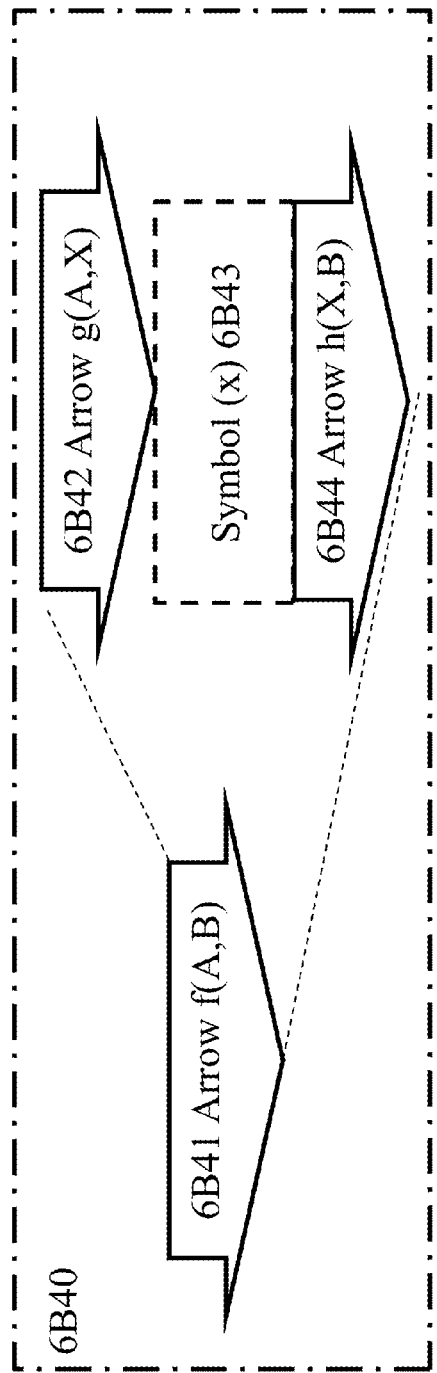
FIG. 6B illustrates an example of a hierarchical pipeline that may be formed by objects of memory blocks and arrows of pipes.

FIG. 6B Hierarchical Arrows

FIG. 6B illustrates examples of hierarchical arrangement of pipes and memory blocks that may be termed a hierarchical arrow of a DUPPL machine. A WSM may employ such hierarchical arrows as illustrated further in FIG. 6C.

Figure 6C:
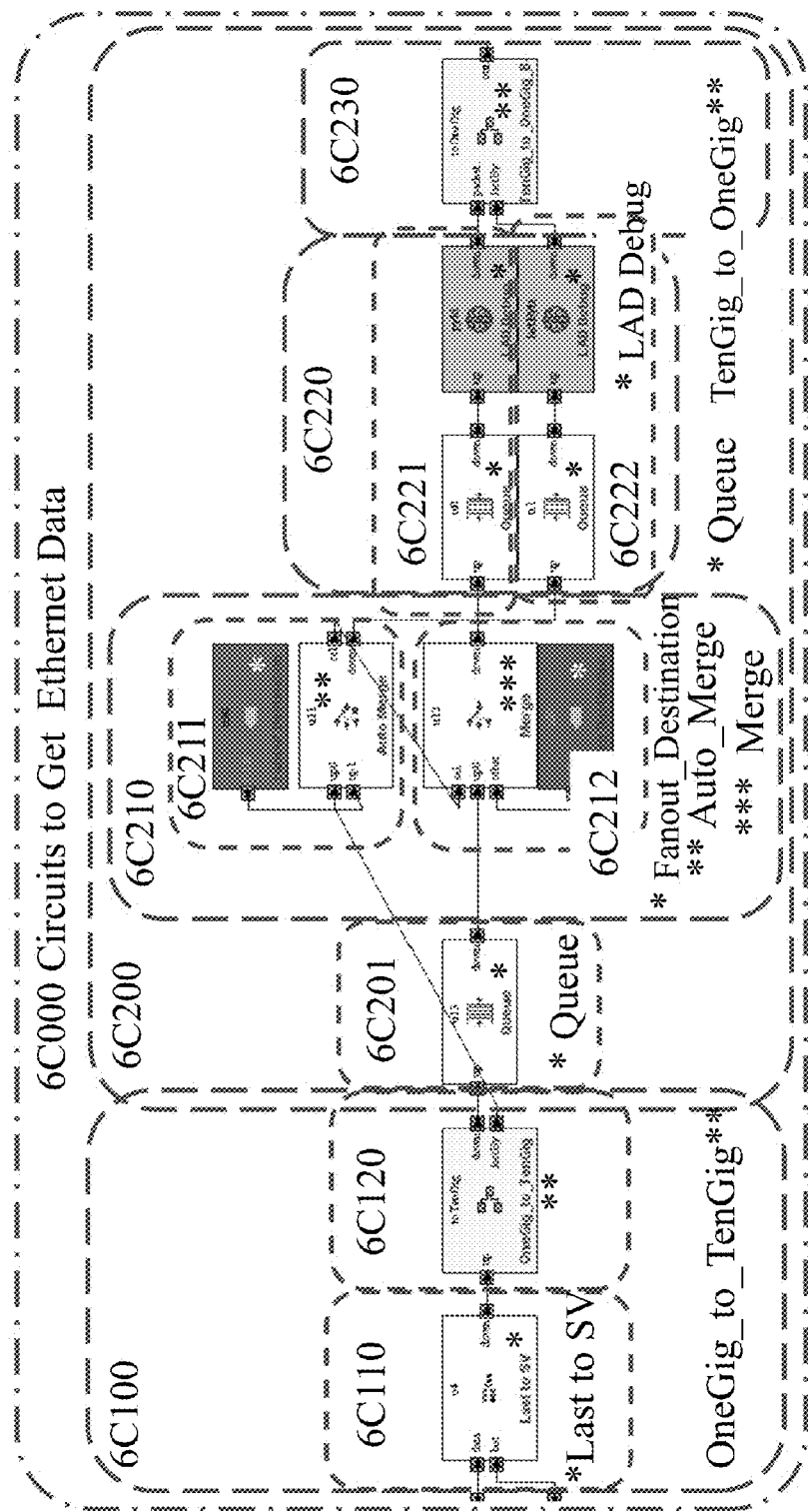
FIG. 6C illustrates an example block diagram for a circuit that implements aspects of a WSM machine and is configured to get Internet data.

FIG. 6C A WSM Arrow to Get Ethernet Data

FIG. 6C illustrates circuits to get data from the Internet as an arrow Get Ethernet Data 6C000. Such a circuit, 6C000, may be realized, for example, via circuits employing the method of an application of fork and join circuit arrangements of FIG. 6A combined with the method of a hierarchical arrangement of circuits of FIG. 6B. The apparatus of 6C000 may be realized via a block diagram language for digital circuit design such as Matlab® Simulink, Annapolis Microsystems CoreFire (used in FIG. 6C) and many other commercial tools for representing circuits as a block diagrams. In particular, FIG. 6C illustrates circuitry in block form from a graphical circuit design tool (e.g., Microsystems CoreFire), which allows a designer to create a circuit by editing, dragging, dropping and interconnecting blocks for particular circuitry. In some embodiments, the blocks of the graphical circuit design tool may represent portions of VHDL code, which in turn can be used to create an FPGA image.

Contemporary art of such block diagram languages allows the use of instruction sets, random access memory, and arbitrary feedback loops. The apparatus 6C000 avoids instruction sets, random access memory, and arbitrary feedback loops comprising instead a hierarchy of feed-forward parallel pipelines having forks, joins, queues, and other discrete logic according to the illustration of FIG. 6C.

Circuits 6C000 may comprise a hierarchical pipeline of two pipes, an initial pipe 6C100 preparing data for processing by a second pipe 6C200. Such an initial pipe 6C100 may comprise a further hierarchical pipeline of two pipes, an initial pipe 6C110 preparing data for processing by a second pipe 6C120. A block diagram language may allow brief annotation of the function of such a pipe 6C110, having a brief name such as Last-to-SV that may convey a function of creating an order among signal lines needed for a circuit 6C120. A follow-on circuit 6C120 then may perform a clocking function that converts a stream of data having a clock rate of 1 gigabit per second, "OneGig" to a clock rate of ten gigabits per second, "TenGig". Such a circuit 6C120 may generate a clock line that may be split from a data line, a clock line providing a signal to a block of circuits 6C211 in parallel with a data line providing a signal to a data queue circuit 6C201. Such an arrangement of circuits 6C120, 6C211, and 6C201 forks the information of circuit 6C120 into two distinct parallel paths, one of a clock for a circuit 6C211 with a distinct parallel path of data for a circuit 6C201. A further arrangement of circuits 6C210 may arrange a circuit block 6C211 with a parallel circuit block 6C212 having functions of fanning out data and of merging data. Such parallelism of data may be preserved in a subsequent block of circuits 6C220 having parallel queues and debug functions such as circuits 6C221 for "automerge" and circuits 6C222 for merge data. A further arrangement of circuits 6C221, 6C222, and 6C230 may comprise a join function that may join the signals from blocks 6C221 and 6C222 in a block 6C230 transforming signals from ten gigabits per second to one gigabit per second in the example of FIG. 6C.

A pipe 6C000 may comprise an input pipe to Get Ethernet Data from an Ethernet circuit 1A01 containing data from the Internet. Such a pipe 6C000 may comprise some circuits of an arrow 1A20 of FIG. 1A that may obtain a GET symbol 1A10 from the Internet.

Figure 7:
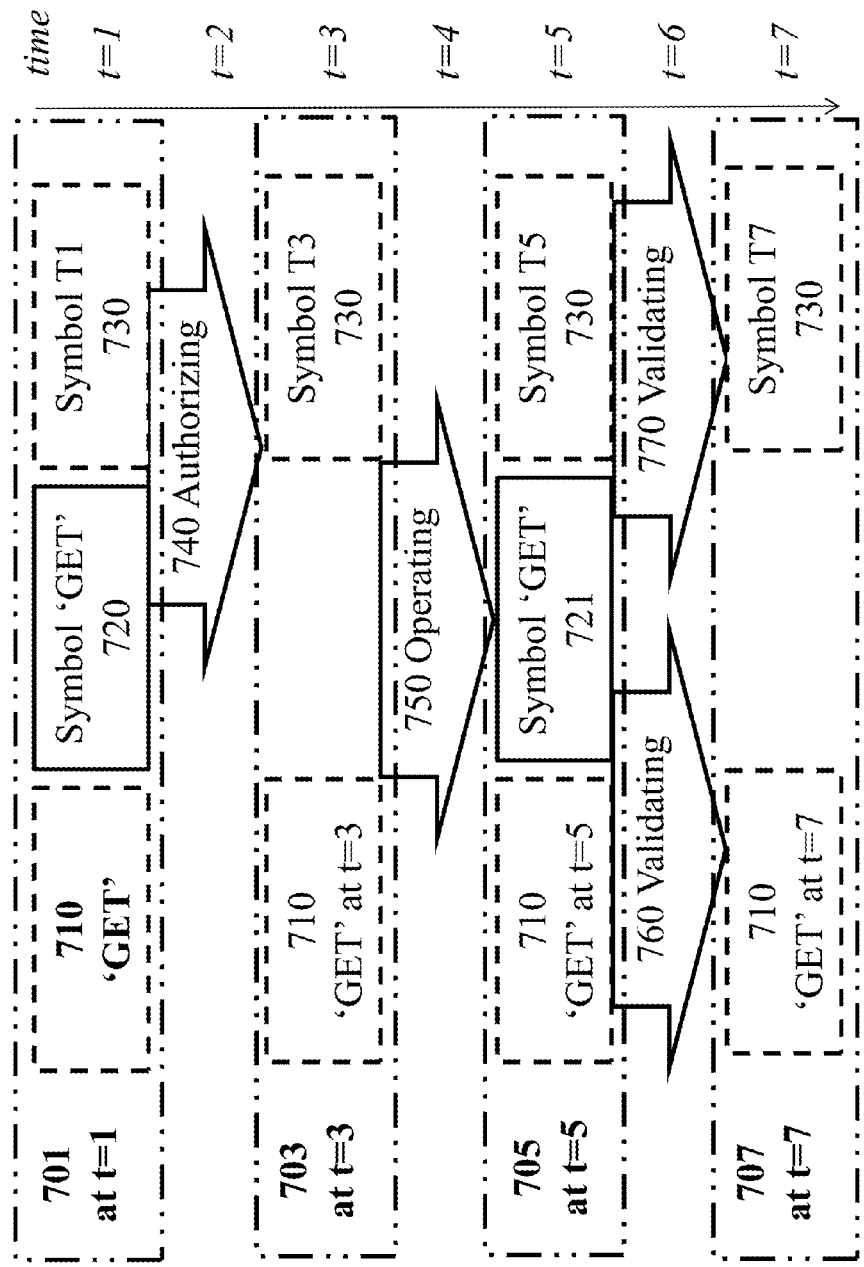
FIG. 7 illustrates examples of token processing.

FIG. 7 Timing of Token Processing

FIG. 7 illustrates examples of token processing that may occur in a DUPPL machine. A Web Server Machine (WSM) may realize token processing of FIG. 7 via circuits 6C211 corresponding to timing signals T1, T3, T5, and T7 of FIG. 7. A WSM may realize token processing of FIG. 7 via circuits 6C212 corresponding to data symbols 720, 721, and 730 of FIG. 7.

Figure 8:
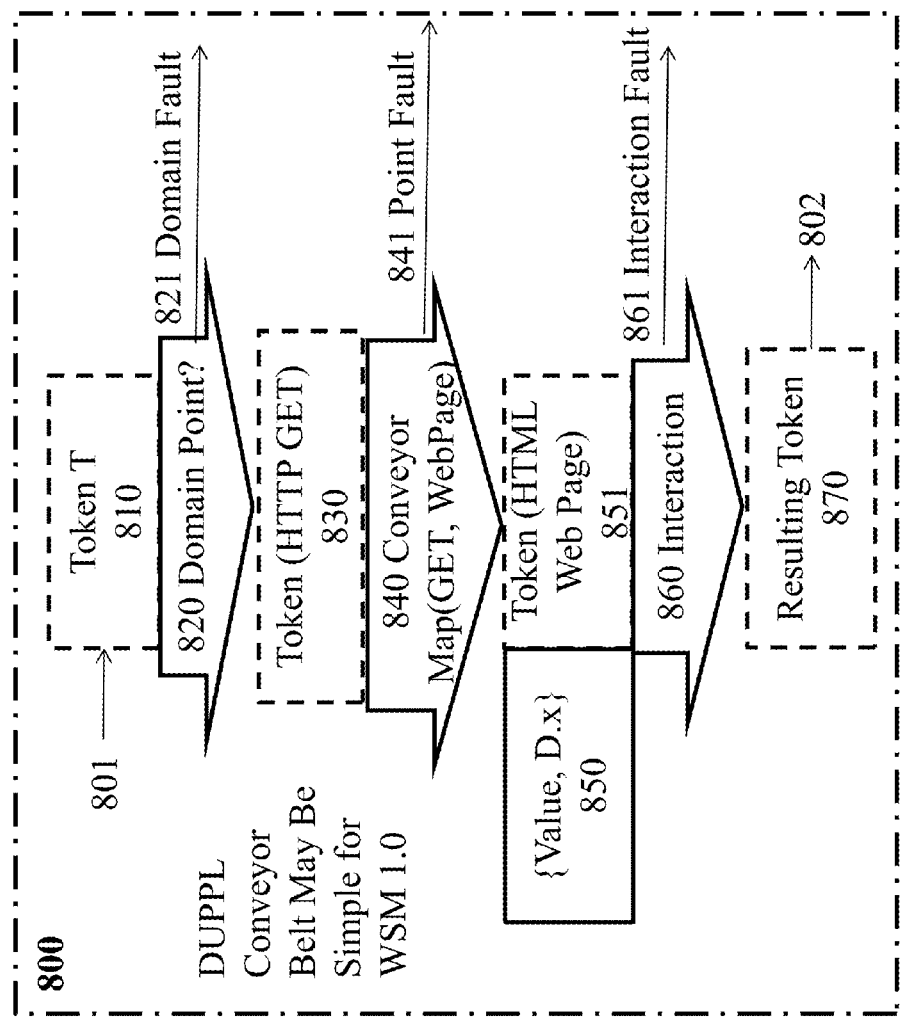
FIG. 8 illustrates an example conveyor belt for processing tokens through a sequential arrangement of arrows.

FIG. 8 Simplified Conveyor Belt

FIG. 8 illustrates an example conveyor belt for processing tokens through a sequential arrangement of arrows providing rapid access to a large collection of symbols and tokens. A WSM may include a symbol 'GET' and a symbol Web Page that may have a direct one-to-one mapping realizing the conveyor belt apparatus of FIG. 8 via a signal line 840 from a GET request 830 to a Web Page 850 such that a GET symbol may cause the delivery of such a Web Page. Thus, a simple signal line may achieve the function of the DUPPL Conveyor Belt arrangement of circuits of FIG. 8.

Figure 9A:
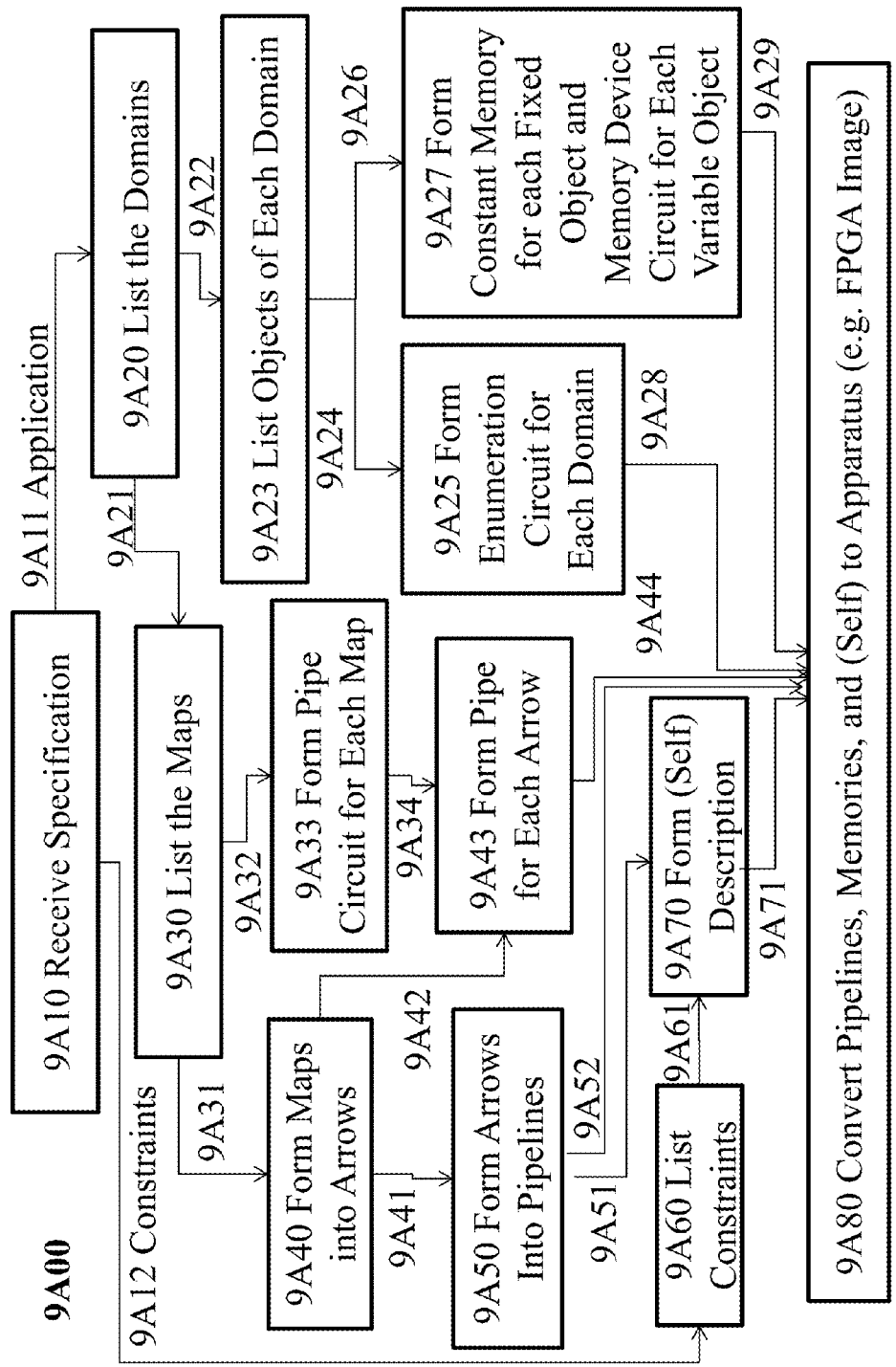
FIG. 9A illustrates an example flow chart that depicts a method for transforming a specification into a representation of a DUPPL machine that can be implemented by a reconfigurable apparatus, such as an FPGA.

FIG. 9A Method for Transforming a Specification into a Machine

FIG. 9A illustrates an example flow chart that depicts a method for transforming a specification into a DUPPL machine. A specification of a WSM may comprise text 2B100 providing a human readable specification in natural English language. Via symbol notation 2A00, such a WSM specification 2B100 may be expressed more compactly in a symbolic form 2B200. A method for transforming specifications 2B100 and 2B200 into a WSM comprising circuits according to FIGS. 3 through 8 is represented in FIG. 9A.

Designers applying the method of FIG. 9A may receive a specification according to a process 9A10. The specification may comprise a statement as illustrated in 2B100 of FIG. 2B. Designers may identify an application 9A11 expressed in such a specification. In the case of specification 2B100, 9A11 may comprise a single application defining a WSM for recognizing HTTP Syn and GET requests and serving a single corresponding HTML web page. The method of FIG. 9A may be used to construct a DUPPL machine having many different WSM's having a diversity of applications of which 2B 100 serves as an illustration. The illustrative specification of 2B100 may be referred to for convenience as WSM 1.0.

For a WSM application 9A11, there may be Domains 9A20 defining for example collections of data elements of such a WSM. A WSM 1.0, for example, may include domains TCP IP, HTTP, and HTML expressed, for example, in English in 2B100 and expressed in symbol notation in 2B200. A process 9A22 may cause the objects of each domain to be identified, forming the contents of an object list 9A23 for each domain 9A20. A WSM 1.0, for example, may include a Domain HTTP, the objects of which may be "SYN" and "GET" according to notation 2A00 expressed as a hierarchical Domain thing (HTTP) of 2B200 containing data elements (SYN request) and (GET request) compactly noted in 2B200 as (HTTP (SYN request)(GET request)).

The application of a process 9A00 noted in FIG. 9A may result in the generation of data objects, pipes, arrows, and memory blocks, circuits, forming an apparatus 9A80 of FIG. 9A

Figure 9B:
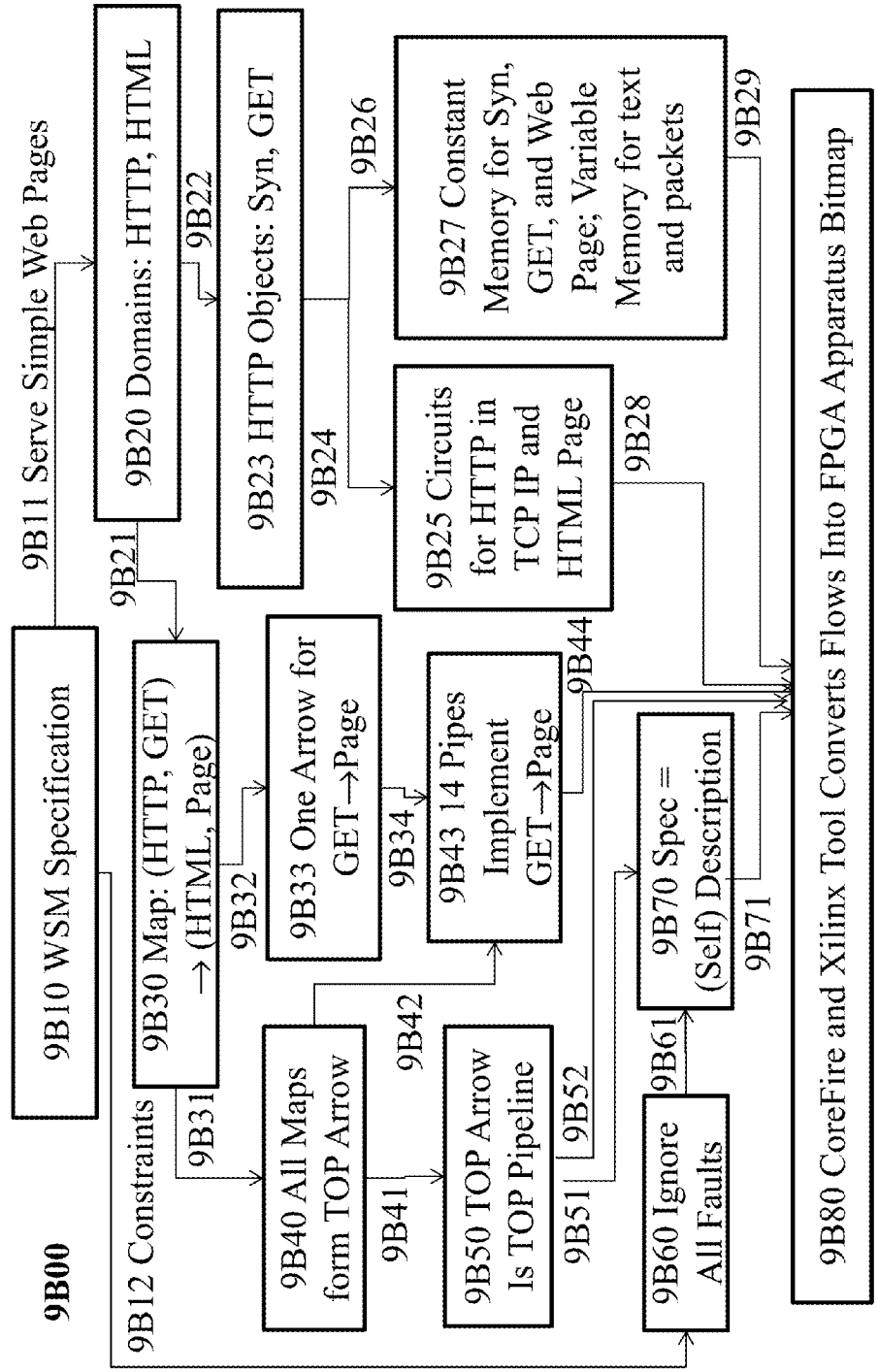
FIG. 9B illustrates an example flow chart that depicts a method for transforming a web services specification into a representation of a WSM that can be implemented by a reconfigurable apparatus, such as an FPGA.

FIG. 9B Method for Transforming a Specification into a WSM

FIG. 9B illustrates an example flow chart that depicts a method for transforming a specification for an example WSM 1.0 into a web server machine apparatus according to a DUPPL machine method 9A00. According to the discussion of FIG. 9A, there may be a WSM specification 9B10, a WSM application 9B11 to serve simple web pages, Domains 9B20 that may include HTTP and HTML, for example, and from an enumeration process 9B22 there may be a list of HTTP objects 9B23 that may include SYN and GET. Pairs of objects of domains of a WSM may be analyzed to identify maps 9B30. In the example WSM 1.0, such maps may include a Map: (HTTP, GET)→(HTML, WebPage). Process 9B00 for an example WSM 1.0 may include the analysis of maps 9B30 to identify a composite top level collection of maps, TOP, 9B40, termed an arrow as are certain collections of maps. The TOP arrow 9B40 may be expressed in a symbol form in a symbol form of a WSM 1.0 specification 2B200 of FIG. 2B. According to a further analysis 9B41 of a TOP arrow 9B40, a TOP pipeline comprising a hierarchy of arrows may be formed as a TOP Pipeline 9B50. Such a TOP Pipeline may comprise circuits to get data from an Ethernet Port 80, such as example circuitry of FIG. 6C forming an initial pipe of such a pipeline. A design process 9B52 may transform a TOP Pipeline 9B50 into blocks of a block diagram language 9B80 that may be converted, for example, into a bitmap personality of a Field Programmable Gate Array (FPGA) to form an example WSM 1.0 via a bitmap of a Xilinx FPGA, for example.

A further analysis 9B32 of a map 9B30 may determine whether it may be helpful to form a conveyor belt for rapid access to data of a DUPPL machine. A resulting expression 9B33 may associate the identification of a GET request in an HTTP Domain with the generation of a Web Page in an HTML Domain defining a simple conveyor belt. A further design process 9B34 may convert an expression 9B33 into a hierarchy 9B43 of unidirectional pipes having forks and joins but having no loops according to the method of DUPPL machines. A design process 9B44 may transform a GET→Page Pipeline 9B43 into blocks of a block diagram language 9B80 that may be converted along with other blocks into a bitmap personality of a WSM 1.0 FPGA.

A further analysis 9B24 of HTTP Objects 9B23 may result in circuits 9B25 checking variable memory blocks of a DUPPL machine WSM 1.0 for conformance to a given Domain. Domain checking circuits 9B25 may check for conformance to WSM 1.0 Domains TCP IP, HTTP, and HTML, for example. An associated analysis 9B26 of domain object 9B23 may result in: a differentiation between values to be stored in constant memory blocks of Read Only Memory (ROM), such as the constant symbols SYN, GET, and the contents of a Web Page; a differentiation from variable symbols for TCP IP Packets and text received from such packets as extracted by various pipe segments of a TOP pipeline. A design process 9B29 may transform a constants and variables 9B27 into blocks of a block diagram language 9B80 that may be converted along with other blocks into a bitmap personality of a WSM 1.0 FPGA.

Figure 10:
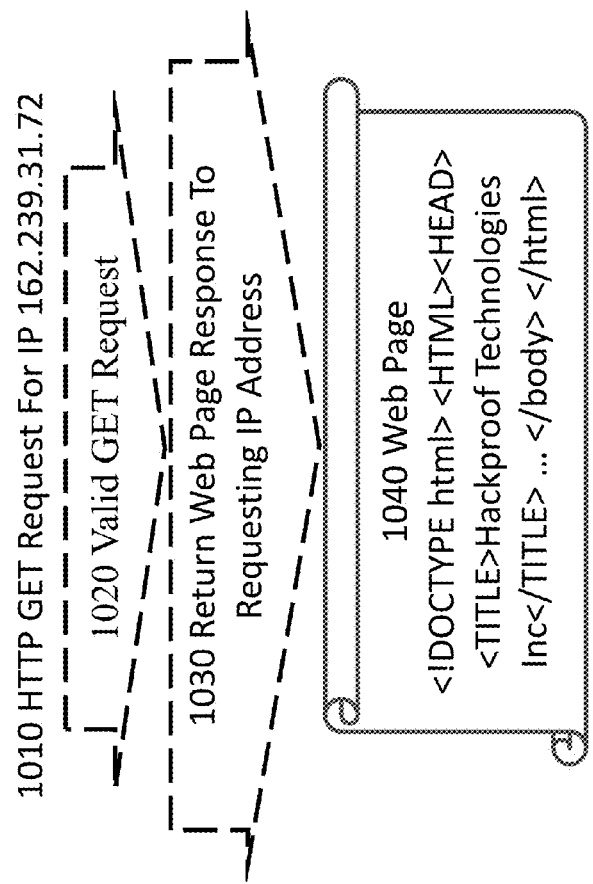
FIG. 10 illustrates a generalized flow chart of a WSM that receives an HTTP GET Request and responds with a web page.

FIG. 10 A WSM Apparatus Top Level Application

FIG. 10 illustrates a Web Server Application 1000 resulting from, for example, the application of the method of FIG. 9B to a specification 2B100. Such an application may comprise a domain-specific machine for the domain of web server applications. Such a machine may accept an HTTP GET request 1010 from an IP address (e.g., 162.239.31.72); such a machine may include an arrow 1020 of pipes that may validate such a GET request; such a machine may include an arrow 1030 of pipes that may return a web page response to the requesting IP address of Request 1010; such a machine may deliver a web page 1040 via the transmission of IP packets to such an IP address 162.239.31.72.

A symbol 1040 noted as "Web Page" may comprise a fixed sequence of text, e.g. written in the HTML language or other language for expressing web pages. Such a symbol 1040 may have a fixed value "<!DOCTYPE html><HTML><HEAD><TITLE>Hackproof Technologies Inc.</TITLE> . . . (other web page content)</body></html>

FIG. 11 Detailed Pipes of a GET Arrow

FIG. 11 illustrates additional details 1100 of a web server application, elaborating arrow 1020 of FIG. 10. Specifically, an arrow 1020 may comprise a sequence of pipes 1110 to 1150 achieving the logic of an HTTP domain and testing symbols thereby generated for conformance to such an HTTP domain. More specifically, a pipe 1110 may receive an HTTP synchronization request, noted as Syn Request for the WSM itself, referred to as a<Static.Host.IP>; a further pipe 1120 may determine whether HTTP information received forms a Valid Syn Request; that failing, control may pass from such a pipe to a fault handling mechanism which may, for example, ignore such packets; a further pipe 1130 may save an IP address from such a Syn Request; that failing, control may pass from such a pipe to a fault handling mechanism which may, for example, ignore such packets; a further pipe 1140 may recognize an HTTP GET Request From an IP GET.IP that is synchronized; that failing, control may pass from such a pipe to a fault handling mechanism which may, for example, ignore such packets; a further pipe 1150 may validate a resulting GET request as a Valid GET Request; if the validation of pipe 1150 fails, control may pass from such a pipe to a fault handling mechanism which may, for example, ignore such packets.

In general, arrows such as a GET arrow 1020 may comprise pipes realizing more detailed logic of such an arrow, recognizing conditions of success and failure that comprise faults and directing control from a given pipe to a different pipe comprising a response to such a fault condition.

Figure 12A:
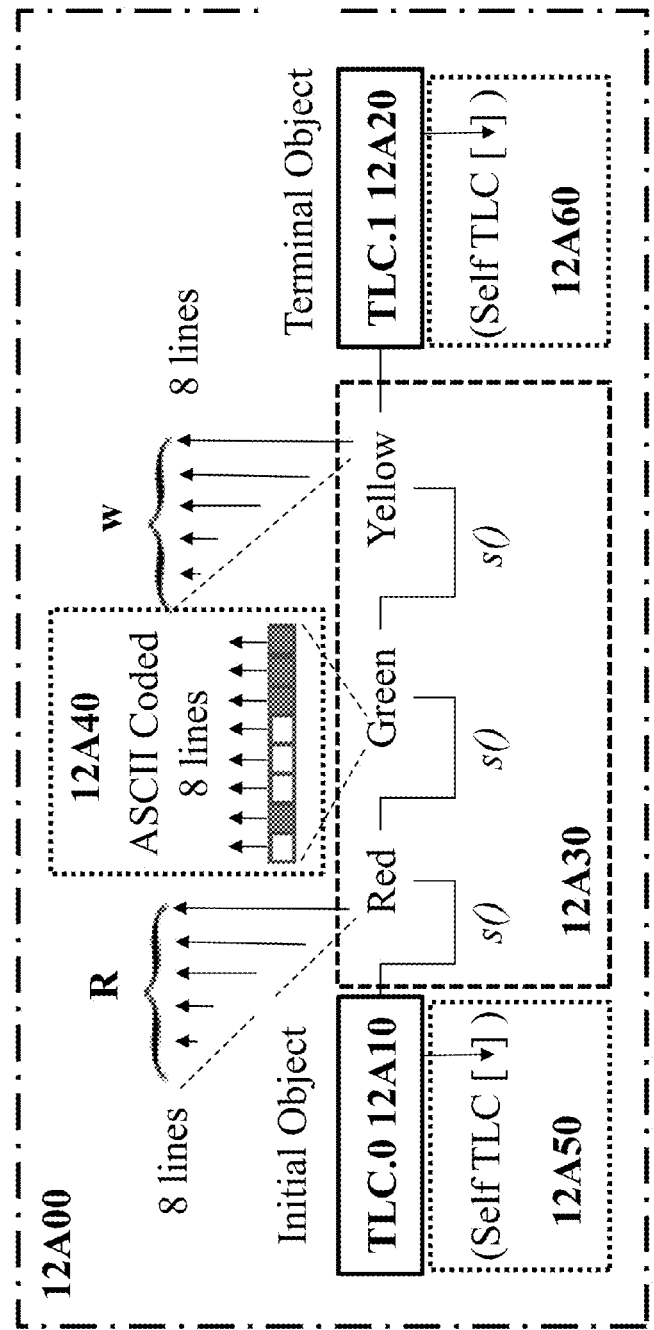
FIG. 12A illustrates an example DUPPL machine circuitry having constants for a domain of traffic light colors (TLC).

FIG. 12A Bit Level Constants for Traffic Light Colors Domain

FIG. 12A illustrates an example DUPPL machine circuitry having bit-level constants for a domain of traffic light colors (TLC). FIG. 12A describes constants of a DUPPL machine that may be a domain-specific machine for a traffic light control domain.

FIG. 12B Bit Level Constants for a TCP IP Domain

FIG. 12B illustrates an example circuitry of a WSM having constants for a domain of Internet Protocol (IP) addresses, a TCP IP Domain. In particular, FIG. 12B illustrates circuits for constants, word reverses and concatenation in block form from a graphical circuit design tool (e.g., Microsystems CoreFire), which allows a designer to create a circuit by editing, dragging, dropping and interconnecting blocks for particular circuitry. In some embodiments, the blocks of the graphical circuit design tool may represent portions of VHDL code, which in turn can be used to create an FPGA image. The function of the circuitry 12B100 illustrated in FIG. 12B may provide a concatenation of bit level constants and input data to produce an IP address. Bit-level constants for the decimal digits 010642 may be generated via Constant blocks, manipulated for alignment via Word Reverse blocks, and finally concatenated to form a sequence of such bits for use in the pipe of which the circuits 12B 100 may be a part. Such a sequence may comprise, for example, a static web address.

FIG. 13A, a Conventional Mechanization of a Web Server Application

FIG. 13A illustrates the time line of operation of a web server application 13A00 on a general purpose computer having an operating system and web server application realized via a contemporary von Neumann central processing unit (CPU) having an instruction set architecture (ISA) with registers and a random access memory (RAM). The time line across the top of FIG. 13A illustrates how a conventional computer executes a web services application, each step in sequence. At each time T1, T2, etc. the operating system (OS) and applications share various instruction registers of various CPUs, saving persistent information in a large shared RAM that may be more permanently stored on non-volatile memory such as a hard drive.

Such a WSM 13A00 may consume a certain amount of power through the operation of its CPU, RAM, hard drive, and other computing and communications components.

FIG. 13B WSM Mechanization of a Web Server Application

In contrast to such a conventional computer, a WSM comprises hardware having a timing diagram 13B00 showing the timing of pipes of hard wired logic, e.g. that form packets from the signals received at an Ethernet cable; having hard wired logic of pipes that extract messages from such packets; having hard wired logic of pipes that recognize HTTP SYN and GET requests, and having hard wired logic of pipes that generate a Web Page previously stored in read only memory in a form of packets at an Ethernet cable addressed to appear at the IP address that issued the GET request. Thus, WSM timing diagram 13B00 searches for an applications domain expression such as a GET request of an HTTP domain; finding such a GET request, a WSM generates IP packets of a TCP IP domain comprising a Web Page of an HTML domain.

Such a WSM 13 B00 requires no such shared registers since each variable may be represented in its own variable object memory block of a given pipe and the value of the variable object may be constrained by domains hardcoded into the WSM.

Such a WSM 13B00 may consume a certain amount of power through the operation of its pipes and related communications components; on a per-request basis, the total power dissipated by such a WSM 13B00 described in FIGS. 1A through 12B may be significantly less than that of a conventional computing machine performing web services applications, 13A00. Such a WSM 13B00 therefore may be termed a green computing machine.

Malware may infect random access memory (RAM) of a general purpose computer. In contrast, a WSM retains information in the isolated memory blocks that cannot be randomly accessed. Indeed, the memory blocks of a WSM can only be accessed via hardware of pipes that perform various functions such as validation checks on symbols as they are passed through the pipe circuitry. As a result of such a validation, any such memory block may contain only validated results that satisfy the constraints of the hard-coded domains of the application being implemented in the WSM. Thus, the circuits of a WSM may prove much more resistant to software and network-based malware that uses RAM, and in some cases impervious to the types of malware that prey on computers having RAM.

The invention claimed is:

1. A domain-specific web server apparatus comprising:
   first circuitry configured to receive a hypertext transfer protocol (HTTP) request;
   second circuitry configured to generate an input symbol based on the HTTP request;
   third circuitry configured to validate that a value of the input symbol is valid according to a first domain, wherein the first domain is one of a plurality of domains embedded into hardware of the domain-specific web server apparatus, wherein the first domain includes, via a hardwired symbolic notation, values that the HTTP request is allowed to have;
   fourth circuitry configured to generate an output symbol by mapping the input symbol from the first domain to a second domain of the plurality of domains;
   fifth circuitry configured to determine output data based on the output symbol; and
   sixth circuitry configured to transmit the output data as a response to the HTTP request.

2. The domain-specific web server apparatus of claim 1, wherein the domain-specific web server apparatus has no registers; no central processing unit (CPU); no Random Access Memory (RAM); no instruction registers; no Instruction Set Architecture (ISA); has no operating system (OS); and has no applications programming.

3. The domain-specific web server apparatus of claim 1, wherein the output data includes a web page.

4. The domain-specific web server apparatus of claim 1, wherein the values of the first domain include a first value for a 'SYN' object and a second value for a 'GET' object.

5. The domain-specific web server apparatus of claim 1, wherein the HTTP request includes an HTTP SYN request or an HTTP GET request.

6. The domain-specific web server apparatus of claim 1 further comprising:
   seventh circuitry configured to store a computational self-description of the domain-specific web server apparatus, wherein the computational self-description provides a description of what the domain-specific web server apparatus is configured to perform.

7. The domain-specific web server apparatus of claim 1 further comprising:
   seventh circuitry configured to cause the domain specific web server apparatus to ignore the HTTP request if the value of the input symbol is invalid.

8. The domain-specific web server apparatus of claim 1, embodied in one or more field-programmable gate arrays (FPGA) or one or more application-specific integrated circuits (ASIC).

9. An apparatus comprising:
   one or more field programmable gate arrays programmed, via one or more field programmable gate array (FPGA) images, to cause the apparatus to:
   receive a hypertext transfer protocol (HTTP) request;
   generate an input symbol based on the HTTP request;
   validate that a value of the input symbol is valid according to a first domain, wherein the first domain is one of a plurality of domains embedded into hardware of the one or more field programmable gate arrays, wherein the first domain includes, via a hardwired symbolic notation, values that the HTTP request is allowed to have;
   generate an output symbol by mapping the input symbol from the first domain to a second domain of the plurality of domains;
   determine output data based on the output symbol; and
   transmit the output data as a response to the HTTP request.

10. The apparatus of claim 9, wherein the apparatus has no registers; no central processing unit (CPU); no Random Access Memory (RAM); no instruction registers; no Instruction Set Architecture (ISA); has no operating system (OS); and has no applications programming.

11. The apparatus of claim 9, wherein the output data includes a web page.

12. The apparatus of claim 9, wherein the values of the first domain include a first value for a 'SYN' object and a second value for a 'GET' object.

13. The apparatus of claim 9, wherein the HTTP request includes an HTTP SYN request or an HTTP GET request.

14. The apparatus of claim 9, wherein the one or more field programmable gate arrays are programmed, via the one or more FPGA images, to cause the apparatus to:
   store a computational self-description of the apparatus, wherein the computational self-description provides a description of what the apparatus is configured to perform.

15. The apparatus of claim 9, wherein the one or more field programmable gate arrays are programmed, via the one or more FPGA images, to cause the apparatus to:
   ignore the HTTP request if the value of the input symbol is invalid.

16. A method comprising:
receiving a definition of one or more functions for a hypertext transfer protocol (HTTP) web server to be implemented in an apparatus, wherein the one or more functions include transmitting a response to a received HTTP request;
determining a list of domains, a list of variable objects and a list of maps based on the definition;
determining, based on the list of domains, domain validation pipe circuitry to produce a plurality of domain validation pipe circuits that are each configured to validate input as having a valid value according to at least one domain in the list of domains;
determining, based on the list of maps, domain mapping pipe circuitry to produce a plurality of domain mapping pipe circuits that are each configured to map input between a first domain in the list of domains to a second domain in the list of domains;
determining, based on the list of variable objects, memory block circuitry to produce a plurality of memory block circuits, the plurality of memory block circuits being configured to (a) provide input to and receive output from the plurality of domain validation pipe circuits and (b) provide input to and receive output from the plurality of domain mapping pipe circuits; and
implementing the plurality of domain validation pipe circuits, the plurality of domain mapping pipe circuits and the plurality of memory block circuits into the apparatus such that the apparatus is configured to perform the one or more functions for the HTTP web server.

17. The method of claim 16, wherein the apparatus comprises a field programmable gate array (FPGA), and wherein the implementing the plurality of domain validation pipe circuits, the plurality of domain mapping pipe circuits and the plurality of memory block circuits into the apparatus includes:

converting the plurality of domain validation pipe circuits, the plurality of domain mapping pipe circuits and the plurality of memory block circuits into an FPGA image, and
compiling the FPGA image into the FPGA such that the FPGA is configured to perform the one or more functions for the HTTP web server.

18. The method of claim 16, further comprising:
determining a list of constraints based on the definition; and
determining self-description circuitry based on the list of constraints, wherein the self-description defines what the apparatus is configured to perform;
wherein the implementing the plurality of domain validation pipe circuits, the plurality of domain mapping pipe circuits and the plurality of memory block circuits into the apparatus includes implementing the self-description circuitry into the apparatus.

19. The method of claim 16, wherein the plurality of domain validation pipe circuits includes a first pipe circuit that determines whether a textual symbol has a valid value according to a first domain from the list of domains; and
wherein the plurality of domain mapping pipe circuits includes a second pipe circuit that maps the textual symbol from the first domain to a second domain from the list of domains.

20. The method of claim 16, wherein after implementing the plurality of domain validation pipe circuits, the plurality of domain mapping pipe circuits and the plurality of memory block circuits into the apparatus, the apparatus is configured to perform the one or more functions for the HTTP web server without using an Instruction Set Architecture (ISA).

* * * * *

UNITED STATES PATENT AND TRADEMARK OFFICE
CERTIFICATE OF CORRECTION

PATENT NO. : 9,519,806 B2  
APPLICATION NO. : 14/321097  
DATED : December 13, 2016  
INVENTOR(S) : Joseph Mitola, III It is certified that error appears in the above-identified patent and that said Letters Patent is hereby corrected as shown below:

On the Title Page

On Page 2, Column 1, under Other Publications, Line 22:
Please delete "Wirtten" and insert --Written--

Signed and Sealed this
Second Day of May, 2017

Michelle K. Lee
*Director of the United States Patent and Trademark Office*